(12) United States Patent
Blanz et al.

(10) Patent No.: US 7,533,046 B2
(45) Date of Patent: May 12, 2009

(54) MULTI-NOTE METHOD AND SYSTEM FOR LOANS BASED UPON LEASE REVENUE STREAM

(75) Inventors: Robert Charles Blanz, Upper Montclair, NJ (US); Robert James Gartner, Hackensack, NJ (US)

(73) Assignee: Capital Lease Funding, LLC, New York, NY (US)

( * ) Notice: Subject to any disclaimer, the term of this patent is extended or adjusted under 35 U.S.C. 154(b) by 688 days.

(21) Appl. No.: 10/995,039

(22) Filed: Nov. 23, 2004

(65) Prior Publication Data

US 2005/0102224 A1 May 12, 2005

Related U.S. Application Data

(63) Continuation of application No. 10/042,276, filed on Jan. 11, 2002, now Pat. No. 6,847,946.

(51) Int. Cl.
 *G06Q 40/00* (2006.01)
(52) U.S. Cl. .................................. 705/35; 705/36
(58) Field of Classification Search .............. 705/10–44
 See application file for complete search history.

(56) References Cited

U.S. PATENT DOCUMENTS

| | | | | | |
|---|---|---|---|---|---|
| 5,742,775 | A | * | 4/1998 | King | 705/38 |
| 6,023,687 | A | | 2/2000 | Weatherly et al. | |
| 6,026,403 | A | * | 2/2000 | Siefert | 707/10 |
| 6,049,784 | A | | 4/2000 | Weatherly et al. | |
| 6,148,293 | A | * | 11/2000 | King | 705/35 |
| 6,330,547 | B1 | | 12/2001 | Martin | |
| 2001/0032178 | A1 | | 10/2001 | Adams et al. | |
| 2001/0047327 | A1 | | 11/2001 | Courtney | |
| 2001/0054022 | A1 | | 12/2001 | Louie et al. | |
| 2003/0018575 | A1 | | 1/2003 | Beggins et al. | |
| 2003/0105708 | A1 | | 6/2003 | Lee | |
| 2003/0110045 | A1 | | 6/2003 | Kehrli et al. | |

OTHER PUBLICATIONS

"New Deals", Asset Sales Report, v8, n48, Dec. 19, 1994, Dialog file 636, Accession No. 02581713.*

* cited by examiner

*Primary Examiner*—Frantzy Poinvil
(74) *Attorney, Agent, or Firm*—Foley & Lardner LLP

(57) ABSTRACT

A method, system and program product for creating a loan from a revenue stream from a lessee, the method comprising the steps of: determining a revenue stream from a lease of a leased tangible asset; calculating a Breakeven TA Note Rate, and a TA Note Amount for a TA Note based on a Multi-Note Loan Coupon, a TA Note Debt Service and market determined underwriting parameters for the tangible asset; calculating an CL Note Debt Service after the TA Note debt service, and other appropriate amounts, if necessary are subtracted from the revenue; calculating a Breakeven CL Note Rate and a CL Note Amount for a CL Note based on the calculated CL Note Debt Service, the Multi-Note Loan Coupon, a CL Note Debt Service, and market determined underwriting parameters; creating a file structure of one or more files for the TA Note and the CL Note; and associating the TA Note and CL Note to assign priorities for purposes of determining and distributing recoveries to holders of the TA Note and/or the CL Note and/or their designees in the event of a Multi-Note Loan default and allocating the rights and responsibilities of the holders of such notes. In a preferred embodiment, the Multi-Note Loan Coupon is initially an estimated value.

97 Claims, 12 Drawing Sheets

Fig. 4 (contd)
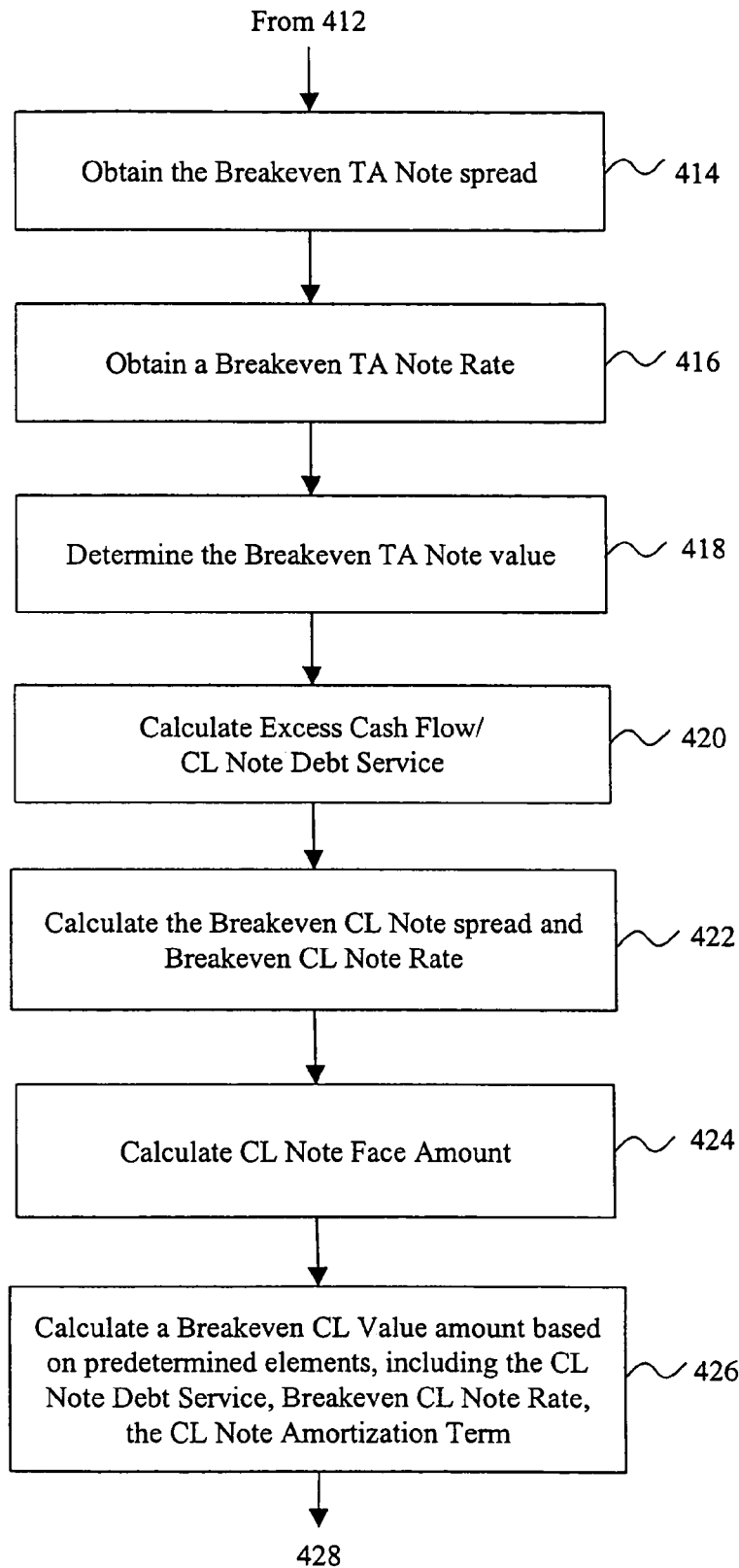

Fig. 4 (contd)
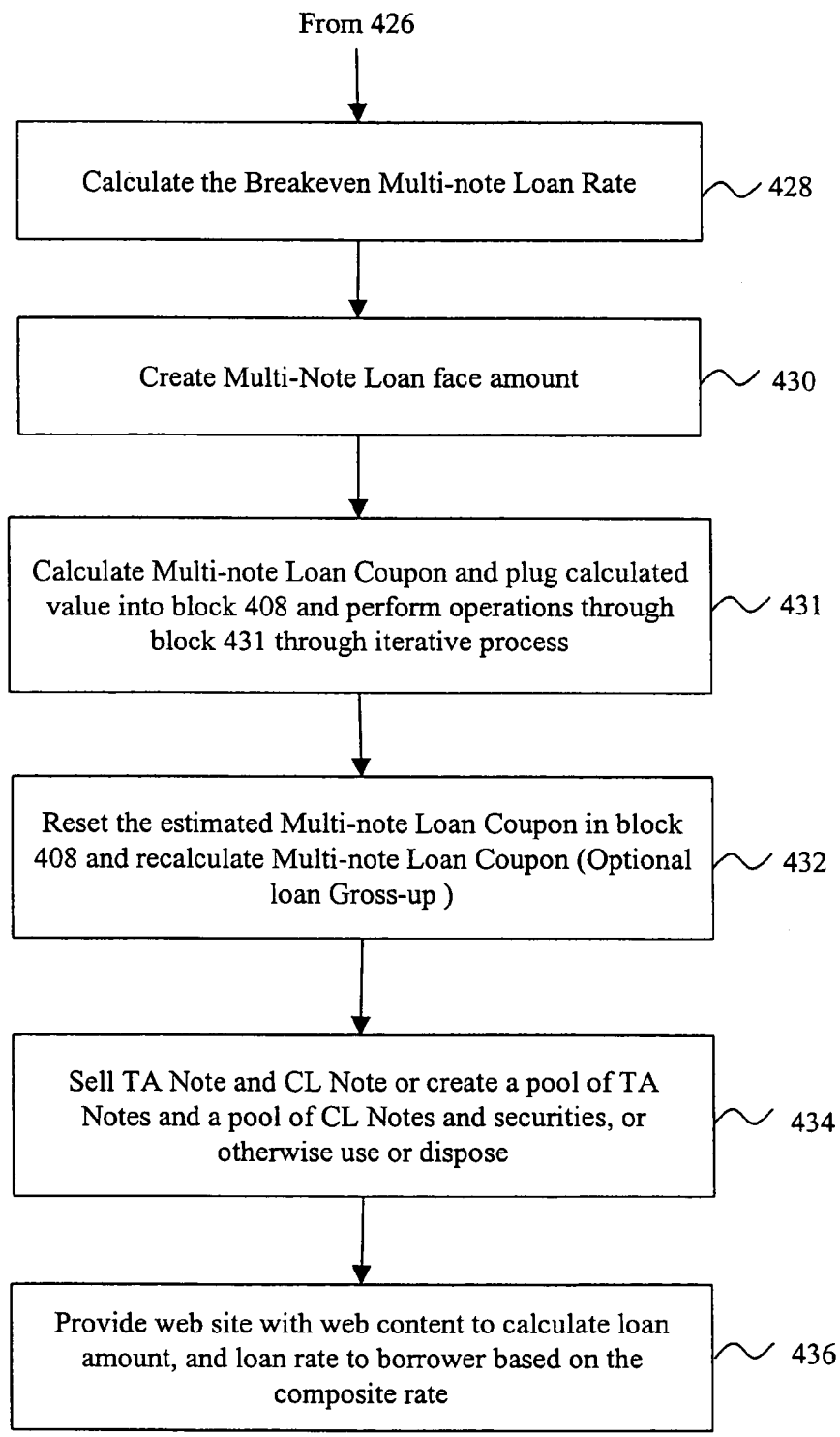

Fig. 5A

Loan Calculator

11/1/01 2:22:50 PM

| Field | Value | Field | Value |
|---|---|---|---|
| Guarantor | (none) | Funding Date | 9/15/01 |
| Moody Rating | A2 Stable | First Debt Service Payment | 10/15/01 |
| S+P Rating | BBB+ Stable | First Full Lease Payment | 10/1/01 |
| Lease Type | NNN | Monthly Lease Payment | 85,000.00 |
| Property Typ | Retail | Monthly Ground Rent | 0.00 |
| | | Lease Term | 240 |
| | | Appraised Value | 10,000,000 |
| | | | 10,000,000 |
| | | Building Size | 55,000 |
| | | Reserves Per SF | 0.00 |
| | | Other Reserves | 0.00 |
| | | Servicer Ratio | 1.000 |
| | | DSCR/Excess | 0 / 1.000 |
| | | Credit Assumption | BBB+ / 6/12/01 |
| | | Corporate Spread | 2.400% |
| | | Conduit Spread | 2.300% |

| | 5 Yr | 10 Yr | 30 Yr |
|---|---|---|---|
| Treasury Curve | 4.74% | 5.20% | 5.61% |

Fig. 5B

|  | Borrower | Lender |  | Tangible Asset | Credit Lease |
|---|---|---|---|---|---|
| Term/Amortization | 217 | 120 | 300 |  |  |
| Treasury Benchmark | 10 Year OTR | 10 Year OTR |  | 10 Year OTR | Interpolated WAL |
| Treasury Floor | 0.000% |  |  | 0.000% | 0 |
| Weighted Average Life | 8.4 |  |  | 9.2 | 5.7 |
| Base Treasury Rate | 5.200% | 5.200% |  | 5.200% | 4.800% |
| Spread/Cost Of Funds | 2.700% | 30/360 | 2.420% | 30/360 | 2.300% | 3.400% |
| Discount Rate | 7.900% | 7.620% |  | 7.500% | 8.200% |
| Coupon |  |  |  | 7.900% | 7.900% |
| Face Amount Of Note | 9,785,576.75 | 9,785,576.67 |  | 7,500,000.00 | 2,285,576.67 |
| Loan Value |  | 9,951,374.06 |  | 7,695,437.10 | 2,255,936.95 |
| Correspondent Fees | -48,927.88 | 0.500% |  | 136.36 psf |  |
| Lender Fees | -97,855.77 | 0.000% | 97,855.77 |  |  |
| Remaining Lease Term | 120 |  |  |  |  |
| Balloon Amount/psf/ltv | 6,041,790.21 | 109.85 | 60.4% |  |  |
| Stub Interest | 0.00 |  |  |  |  |
| Debt Service Reserves | 0.00 |  |  |  |  |
| C+C Insurance Costs | -97,855.77 | 0.000% |  |  |  |
| Placement Fees |  | -49,756.87 |  |  | 0.500% |
| Closing Costs |  | -49,756.87 |  |  | 0.500% |
| Net Proceeds | 9,540,937.33 | 9,949,716.09 |  |  |  |
| Total To CLF |  | 164,139.34 |  |  | 1.68% |

Fig. 5C

Real Estate Underwriting

| | | | |
|---|---|---|---|
| Minimum Cap Rate | 0.0% | 0.0% | 10.2% |
| Maximum LTV | 0% | 75% | 72.9% |
| Minimum DSCR | 1.250 | 1.250 | 1.250 |
| | | | |
| Market Rent (psf) | 0.00 | 1,020,000 | |
| Market Vacancy | 0.0% | 5.0% | -51,000 |
| Effective Income | | 969,000 | |
| | | | |
| Management Fee | 0.0% | 2.0% | 19,380 |
| Admin Fee (psf) | 0.00 | 0.05 | |
| Minimum Admin Fee | 0 | 3,000 | 3,000 |
| | | | |
| Tenant Rollover | ☑ | | |
| Renewal Probability | 0% | 50% | |
| Market Lease Term | 0 | 15 | |

| | Escrow | New | | Renew | | |
|---|---|---|---|---|---|---|
| Tenant Improvements | 0% | 0.00 | 3.00 | 0.00 | 1.50 | 8,250 |
| Leasing Commissions | 0% | 0.0% | 4.0% | 0.0% | 2.0% | 30,600 |
| Capital Expenditures | 0% | 0.00 | 0.00 | | | 0 |
| Other Deductions | 0% | 0 | 0 | | | 0 |
| Net Cash Flow | | | | | | 907,770 |

*Fig. 6A*

Loan Calculator

11/5/01 5:02:33 PM

| | | | | |
|---|---|---|---|---|
| Guarantor | (none) | Funding Date | 9/15/01 | Building Size | 55,000 |
| Moody Rating | A2 | Stable | First Debt Service Payment | 10/15/01 | Reserves Per SF | 0.00 |
| S+P Rating | BBB+ | Stable | First Full Lease Payment | 10/1/01 | Other Reserves | 0.00 |
| Lease Type | NNN | | Monthly Lease Payment | 85,000.00 | Servicer Ratio | 1.000 |
| Property Typ | Retail | | Monthly Ground Rent | 0.00 | DSCR/Excess | 1.000 | 0 |
| | | | Lease Term | 180 | Credit Assumption | BBB+ | 6/12/01 |
| | 5 Yr | 10 Yr | 30 Yr | Appraised Value | 10,000,000 | Corporate Spread | 2.400% |
| Treasury Curve | 4.74% | 5.20% | 5.61% | | 10,000,000 | Conduit Spread | 2.300% |

Fig. 6B

| | Borrower | Lender | Tangible Asset | Credit Lease |
|---|---|---|---|---|
| Term/Amortization | 195 | 120 / 240 | | |
| Treasury Benchmark | 10 Year OTR 0.000% | 10 Year OTR | 10 Year OTR | Interpolated WAL |
| Treasury Floor | | | 0.000% | |
| Weighted Average Life | 8.0 | | 8.7 | 5.7 |
| Base Treasury Rate | 5.200% | 5.200% | 5.200% | 4.800% |
| Spread/Cost Of Funds | 2.700% 30/360 | 2.410% 30/360 | 2.300% | 3.400% |
| Discount Rate | 7.900% | 7.610% | 7.500% | 8.200% |
| Coupon | | | 7.900% | 7.900% |
| Face Amount Of Note | 9,315,987.78 | 9,315,987.77 | 7,289,329.41 | 2,026,658.36 |
| Loan Value | -46,579.94 0.500% | 9,470,679.55 | 7,470,303.28 | 2,000,376.26 |
| Correspondent Fees | -93,159.88 0.000% | | 132.53 psf | |
| Lender Fees | | 93,159.88 | | |
| Remaining Lease Term | 60 | | | |
| Balloon Amount/psf/ltv | 5,009,774.96 91.09 | 50.1% | | |
| Stub Interest | 0.00 | | | |
| Debt Service Reserves | 0.00 | | | |
| C+C Insurance Costs | -93,159.88 0.000% | | | |
| Placement Fees | | -47,353.40 0.500% | | |
| Closing Costs | | -47,353.40 0.500% | | |
| Net Proceeds | 9,083,088.08 | 9,469,132.63 | | |
| Total To CLF | | 153,144.85 1.64% | | |

Fig. 6C

Real Estate Underwriting

| | | | |
|---|---|---|---|
| Minimum Cap Rate | 0.0% | 0.0% | 10.2% |
| Maximum LTV | 0% | 75% | 72.9% |
| Minimum DSCR | 1.250 | 1.250 | 1.250 |
| | | | |
| Market Rent (psf) | 0.00 | 1,020,000 | |
| Market Vacancy | 0.0% | 5.0% | -51,000 |
| Effective Income | | | 969,000 |
| | | | |
| Management Fee | 0.0% | 2.0% | 19,380 |
| Admin Fee (psf) | 0.00 | 0.05 | |
| Minimum Admin Fee | 0 | 3,000 | 3,000 |
| | | | |
| Tenant Rollover | ☑ | | |
| Renewal Probability | 0% | 50% | |
| Market Lease Term | 0 | 15 | |

| | Escrow | New | | Renew | |
|---|---|---|---|---|---|
| Tenant Improvements | 0% | 0.00 | 3.00 | 0.00 | 1.50 | 8,250 |
| Leasing Commissions | 0% | 0.0% | 4.0% | 0.0% | 2.0% | 30,600 |
| Capital Expenditures | 0% | 0.00 | 0.00 | | | 0 |
| Other Deductions | 0% | 0 | 0 | | | 0 |

Net Cash Flow      907,770

MULTI-NOTE METHOD AND SYSTEM FOR LOANS BASED UPON LEASE REVENUE STREAM

CROSS-REFERENCE TO RELATED PATENT APPLICATIONS

This application is a Continuation of U.S. application Ser. No. 10/042,276, filed Jan. 11, 2002 now U.S. Pat. No. 6,847,946.

BACKGROUND OF THE INVENTION

1. Field of the Invention

The present invention relates generally to the fields of lending and leases, and more particularly to the creation of a loan based on a plurality of notes from a lease revenue stream.

2. Background

Single tenant properties that are net leased to credit tenants are an important subset of the overall commercial real estate market. For a variety of strategic, competitive and accounting reasons, many corporations choose to lease properties rather than own the underlying real estate. These types of properties are generally owned by developers who have built the properties, or individuals or corporate owners who purchase them after construction is complete.

Owners of single tenant properties net leased to investment grade companies have historically been financed by banks and insurance companies. This type of loan is based on the creditworthiness of the underlying lessees/tenants and thus relies little on the liquidation value of the property.

Moving down the credit quality curve, the available options for borrowers become fewer and fewer. Prior to the establishment of the public capital market based credit tenant lease ("CTL") lending business created by Capital Lease Funding L.P., ("CLF") in 1995, owners of properties net leased to marginal investment grade (as well as sub-investment grade) tenants have traditionally been financed by traditional real estate lenders which base their loans more upon the conventional real estate values of the properties rather than on the underlying credit strength of the credit tenants, resulting in lower amounts of leverage.

The underwriting analysis for a conventional real estate loan relies heavily on the liquidation value of the real estate securing the loan, the ability of the borrower to adequately address property operations and the borrower's ability to adequately address re-leasing and re-tenanting of the property due to tenant rollover, among other things. Due to these uncertainties and fluctuations in operating income of the underlying property, the loan proceeds from a conventional real estate loan are generally lower than the appraised value of the property (typically no more than 80%) and the debt service coverage ratio is typically no less than 1.20.

The CTL lending business created by CLF in 1995, was instrumental in establishing a viable credit tenant lending program for a variety of types of investment grade tenants and varying qualities of credit tenant leases for which CTL loans were not previously available. The ability of CLF to underwrite and securitize high leverage CTL loans to owners of single tenant properties for substantially all categories of investment grade tenants had provided owners and borrowers with an attractive alternative to traditional forms of funding for these properties, particularly for those leased to marginal investment grade credits.

CLF operates as a specialty lender originating CTL mortgage loans made primarily to all types of investment grade tenants under leases ranging from 10 to 25 years in length. Each credit tenant loan is secured by a first mortgage on a commercial real property subject to a long term net lease to a credit tenant and by an assignment of the credit tenant lease and all rents due under the lease. Under a credit tenant lease, the principal parameter underlying the transaction is the credit quality of the applicable tenant rather than the credit quality of the borrower or the liquidation value of the property. The underwriting analysis for a credit tenant loan consists primarily of an analysis of the credit and business profiles of the credit tenant and the credit tenant lease. The typical credit tenant loan made by CLF has a 20 year term and is fully amortized by scheduled rent payments under the credit tenant lease. As a result, CLF's credit tenant loans (which approach a ratio of scheduled rent payments to debt service of 1.0) tend to have debt service coverage ratios lower than conventional mortgage loans, as well as higher loan to value ratios, approaching 95%.

Lease Types

Historically, CTL loans, which were characterized by high leverage with debt service coverage ratios approaching 1.0, were made to property owners who have net leased their property to tenants having an investment grade debt rating from a nationally recognized statistical rating agency ("Rating Agency"), but were only available when the applicable lease was a "bond" type lease. In a bond type lease, the credit tenant is responsible for every monetary obligation associated with managing, owning, developing and operating the leased premises including, but not limited to, the costs associated with the utilities, taxes, insurance, maintenance, ordinary and capital repairs and replacements and losses due to a casualty and/or a condemnation. The credit tenant has no ability to terminate or abate rent under a "bond" lease. Consequently, loans secured by "bond" leases are analyzed as if they were direct obligations of the applicable tenant.

Double and triple net leases are generally long term leases to tenants who are responsible for paying most of the costs of owning, operating, and maintaining the leased property during the term of the lease, in addition to the payment of a monthly net rent to the lessor for the use and occupancy of the premises. Under double and triple net leases, in contrast to "bond" leases, a tenant has the right to terminate the applicable lease or abate rent thereunder upon the occurrence of a significant casualty or condemnation. Under a double net lease, the tenant may terminate the lease or abate rent thereunder, upon the failure by the lessor to maintain or repair the property, provide adequate parking, maintain common areas or comply with other affirmative covenants of the lease, or if the lessor leases property to a competitor of the credit tenant within a specified radius of the property or otherwise violates other negative covenants in the lease.

The financing of double net and triple net leases to investment grade tenants as CTL loans was pioneered by CLF in 1995. Previously, double net and triple net leases had been traditionally financed as conventional real estate loans. CLF's specialized lease enhancement mechanisms substantially mitigate the risk of potential interruption in the rental stream so that such double and triple net leases can be evaluated as if they were "bond" leases. CLF's lease enhancement mechanisms comprise primarily an integrated set of specialized insurance policies, servicer advancing mechanisms, and various borrower reserve funds. These mechanisms support the lessor's maintenance and other obligations under a credit lease in order to mitigate the risk of rent abatement or lease termination by the credit tenant due to the failure of a lessor to perform its obligations.

Commercial Mortgage Backed Securities Market

The commercial mortgage backed securities ("CMBS") market was established initially as a vehicle to liquidate the commercial mortgage loans held by the RTC resulting from the S&L financial crisis. The CMBS market has now grown into an approximately $80 billion annual market, with strong liquidity, strong research and a wide following by many institutions. With the maturity of the CMBS market, CMBS pools have now become homogenous in terms of the collateral type and underlying commercial mortgage loan terms. The current CMBS securities market is structured such that the majority of the securities created from the underlying mortgage loans have 10 year final maturities, whereas the securities created from CLF's long term CTL loans have final maturities ranging from 15 to 25 years.

The CMBS 10-year "AAA" security has also become a very liquid "benchmark" security and investors will generally pay a premium for this liquidity while, on the other hand, they will "punish" other types of "off the run" (i.e. non-conforming) CMBS securities, which are not perceived as being as liquid. Thus, as the CMBS market has matured, it has become more difficult to sell "off-the-run" CTL securities, which often have final maturities beyond 10 years, in the public CMBS capital markets. In addition, from time to time as prevailing economic conditions worsen and saturation in the marketplace of certain credits develops, there may be limited demand and diminished liquidity for CTL securities backed by many types of investment grade tenants in both the CMBS market and the private whole loan market at any given time.

Thus, a current problem is the need for more liquidity in the public and private capital markets for securities created from high leverage CTL real estate loans based upon lease revenue streams from long-term credit tenant leases.

SUMMARY OF THE INVENTION

Briefly, one embodiment of the present invention comprises a method of creating a loan from a revenue stream from a lessee, comprising the steps of: determining a revenue stream from a lease of a leased tangible asset; calculating a Breakeven TA Note Rate, and a TA Note Amount for a TA Note based on a Multi-Note Loan Coupon, a TA Note Debt Service and market determined underwriting parameters for the tangible asset; calculating an CL Note Debt Service after the TA Note debt service, and other appropriate amounts, if necessary are subtracted from the revenue; calculating a Breakeven CL Note Rate and a CL Note Amount for a CL Note based on the calculated CL Note Debt Service, the Multi-Note Loan Coupon, a CL Note Debt Service, and market determined underwriting parameters; creating a file structure of one or more files for the TA Note and the CL Note; and associating the TA Note and CL Note to assign priorities for purposes of determining and distributing recoveries to holders of the TA Note and/or the CL Note and/or their designees in the event of a Multi-Note Loan default and allocating the rights and responsibilities of the holders of such notes.

In a further aspect of the present invention, the Multi-Note Loan Coupon is initially an estimated value, wherein the Breakeven TA Note Rate and the CL Note Debt Service and the Breakeven CL Note Rate are calculated or determined using the estimated Multi-Note Loan Coupon, and further comprising calculating the Multi-Note Loan Coupon based on the Breakeven TA Note Rate and the Breakeven CL Note Rate.

In a further aspect of the present invention, the step is provided of recalculating the Breakeven TA Note Rate, the Breakeven CL Note Rate and the Multi-Note Loan Coupon based on the original calculated Multi-Note Loan Coupon.

In a further aspect of the present invention, the step is provided of performing the recalculating step for the Breakeven TA Note Rate, the Breakeven CL Note Rate and the Multi-Note Loan Coupon multiple times until a criteria is met.

In a further aspect of the present invention, the criteria is that a margin from the Multi-Note Loan Coupon equals or exceeds and predetermined amount.

In a further aspect of the present invention, the CL Note Rate is determined in part from a corporate credit rate spread applicable to the lessee or its industry.

In a further aspect of the present invention, the step is provided of calculating a Breakeven Multi-Note Loan Rate using the Breakeven TA Note Rate and the Breakeven CL Note Rate as elements in an algorithm.

In a further aspect of the present invention, the associating step comprises assigning priority of distribution of tangible asset recovery proceeds first to the TA Note, and any excess to the CL Note and assigning priority of the distribution of the proceeds of a Defaulted Lease Claim first to the CL Note and any excess to the TA Note.

In a further aspect of the present invention, the determining and distributing step comprises on the occurrence of a sale of the tangible asset after a default under the Multi-Note Loan, calculating an excess of sale proceeds over amounts due for a payoff of the TA Note and, on receipt of the proceeds from the Defaulted Lease Claim, calculating an excess of proceeds from the Defaulted Lease Claim over amounts due for a payoff of the CL Note; and electronically associating the excess of sale proceeds over the amounts due under the TA Note with the file for the CL Note and/or electronically associating the excess of proceeds from the Defaulted Lease Claim over amounts due under the CL Note with the file for the TA Note.

In a further aspect of the present invention, the step is provided of transferring the calculated excess amount from the sale proceeds of the tangible assets to a holder of the CL Note or its designee.

In a further aspect of the present invention, the step is provided of transferring the calculated excess amount from the Defaulted Lease Claim to a holder of the TA Note or its designee.

In a further aspect of the present invention, the step is provided of electronically associating the one or more files for the TA Note and the CL Note, wherein the one or more files comprise electronic files.

In a further aspect of the present invention, the step is provided of transferring the TA Note and CL Note to different parties.

In a further aspect of the present invention, the step is provided of subtracting from the lease revenues loan reserve amounts to support lessor maintenance and other obligations to mitigate risk of potential termination of or interruption in the lease payments due to the failure of the lessor or others to perform their obligations.

In a further aspect of the present invention, the step is provided of subtracting from the Multi-Note Loan proceeds amounts to pay premiums for specialized insurance policies to mitigate the risk of potential termination of or interruption in the lease payments due to various potential contingencies.

In a further aspect of the present invention, the step is provided of obtaining a Breakeven TA Note Rate comprises obtaining a benchmark rate and a Breakeven TA Note Spread.

In a further aspect of the present invention, the step of obtaining the Breakeven CL Note Rate comprises determining a discount rate based on an algorithm that uses a benchmark rate and a lessee corporate bond spread as elements.

In a further aspect of the present invention, the step is provided of obtaining the Breakeven CL Note Rate comprises determining a discount rate based on an algorithm that uses a benchmark rate and a generic corporate bond spread based on a debt rating.

In a further embodiment of the present invention, a method is provided of creating a loan from a revenue stream from a lessee, comprising the steps of: determining a revenue stream from a lease of a leased tangible asset; calculating and determining parameters of a TA Note and a CL Note based in part on the revenue stream; creating a file structure of one or more files for the TA Note and the CL Note; and associating the TA Note and CL Note to assign priorities for purposes of determining and distributing recoveries to holders of the TA Note and/or the CL Note and/or their designees in the event of a Multi-Note Loan default.

In a further aspect of the present invention, the associating step further comprises allocating rights and responsibilities of the holders of such notes and associating those rights and responsibilities with the TA Note and CL Note file structure.

In a further aspect of the present invention, the step of calculating an CL Note Debt Service after a TA Note debt service is subtracted from the revenue stream; and wherein at least one parameter for the CL Note is determined based on the CL Note Debt Service.

In a further aspect of the present invention, the calculating and determining parameters of a TA Note and a CL Note step is also based in part on a Multi-Note Loan Coupon.

In a further aspect of the present invention, the Multi-Note Loan Coupon is initially an estimated value, and wherein the TA Note parameters and CL Note parameters are calculated or determined using the estimated Multi-Note Loan Coupon; and further comprising re-calculating the Multi-Note Loan Coupon based on the resulting TA Note parameters and the CL Note parameters.

In a further aspect of the present invention, the step is provided of recalculating at least one parameter for the TA Note and the CL Note and recalculating the Multi-Note Loan Coupon based on the calculated Multi-Note Loan Coupon.

In a further aspect of the present invention, the step of calculating and determining parameters for the CL Note comprises determining a discount rate based on an algorithm that uses a benchmark rate and a lessee corporate bond spread as elements and then determining a Breakeven CL Note Rate.

In a further aspect of the present invention, the step of calculating and determining parameters for the CL Note comprises determining a discount rate based on an algorithm that uses a benchmark rate and a generic corporate bond spread based on a debt rating and then determining a Breakeven CL Note Rate.

In a further aspect of the present invention, the step is provided of aggregating a plurality of the TA Notes or the CL Notes to obtain a pool value.

In a further aspect of the present invention, the pool value is sent electronically to a potential buyer.

In a further aspect of the present invention, the steps are provided of providing a web page with web content that performs the calculating and determining step.

In a further aspect of the present invention, the step is provided of calculating a Multi-Note Loan Coupon using the web content; and displaying the Multi-Note Loan Coupon to a potential borrower.

In a further aspect of the present invention, a web page is provided that includes web content that displays TA Notes and CL Notes and that facilitates a potential buyer forming a customized pool of TA Notes or CL Notes.

In a further aspect of the present invention, steps are provided of providing a web page with web content that performs the calculating and determining step, the calculating of the Multi-Note Loan Coupon, and the recalculating of at least one parameter for the TA Note and the CL Note and recalculating the Multi-Note Loan Coupon step.

In a further embodiment of the present invention, a computer-implemented method is provided of creating a loan from a revenue stream from a lessee, comprising the following steps: determining rents from a lease of an asset; obtaining an indication of a value of the asset; obtaining a TA Note to tangible asset value ratio; obtaining an estimated Multi-Note Loan Coupon; calculating a Breakeven TA Note Rate; calculating a Breakeven TA Note Value for a TA Note using an algorithm that includes as factors the indication of value of the tangible asset, the Breakeven TA Note Rate, and the TA Note to tangible asset value ratio and appropriate debt service coverage ratio for the asset; calculating a CL Note Debt Service; obtaining a Breakeven CL Note Rate based in part on the market determined corporate bond spread for the lessee or its industry; calculating a Breakeven CL Note Value based on predetermined elements including the CL Note Debt Service, the Breakeven CL Note Rate and a term for the CL Note; calculating a Breakeven Multi-Note Loan Rate using the Breakeven TA Note Rate, the Breakeven CL Note Rate, TA Note Debt Service and the CL Note Debt Service as elements in the calculation; and calculating a Multi-Note Loan Coupon by adding a lender profit margin to the Breakeven Multi-Note loan Rate.

In a further aspect of the present invention, a computer-implemented system of creating a loan from a revenue stream from a lessee is provided, comprising a processor programmed to perform the following method steps: determining a revenue stream from a lease of a leased tangible asset; calculating a Breakeven TA Note Rate, and a TA Note Amount for a TA Note based on a Multi-Note Loan Coupon, a TA Note Debt Service and market determined underwriting parameters for the tangible asset; calculating an CL Note Debt Service after the TA Note debt service, and other appropriate amounts, if necessary are subtracted from the revenue; calculating a Breakeven CL Note Rate and a CL Note Amount for a CL Note based on the calculated CL Note Debt Service, the Multi-Note Loan Coupon, a CL Note Debt Service, and market determined underwriting parameters; creating a file structure of one or more files for the TA Note and the CL Note; and associating the TA Note and CL Note to assign priorities for purposes of determining and distributing recoveries to holders of the TA Note and/or the CL Note and/or their designees in the event of a Multi-Note Loan default and allocating the rights and responsibilities of the holders of such notes.

In a further embodiment of the present invention, a program product is provided for creating a loan from a revenue stream from a lessee, comprising machine-readable program code for causing a machine to perform the following steps of: determining a revenue stream from a lease of a leased tangible asset; calculating a Breakeven TA Note Rate, and a TA Note Amount for a TA Note based on a Multi-Note Loan Coupon, a TA Note Debt Service and market determined underwriting parameters for the tangible asset; calculating an CL Note Debt Service after the TA Note debt service, and other appropriate amounts, if necessary are subtracted from the revenue; calculating a Breakeven CL Note Rate and a CL Note Amount for a CL Note based on the calculated CL Note Debt Service, the Multi-Note Loan Coupon, a CL Note Debt Service, and market determined underwriting parameters; creating a file structure of one or more files for the TA Note and the CL Note; and associating the TA Note and CL Note to assign priorities for purposes of determining and distributing recoveries to holders of the TA Note and/or the CL Note and/or their designees in the event of a Multi-Note Loan default and allocating the rights and responsibilities of the holders of such notes.

In a further embodiment of the present invention, a program product is provided for creating a loan from a revenue stream from a lessee, comprising machine-readable program code for causing a machine to perform the following method steps: determining a revenue stream from a lease of a leased tangible asset; calculating and determining parameters of a TA Note and a CL Note based in part on the revenue stream; creating a file structure of one or more files for the TA Note and the CL Note; and associating the TA Note and CL Note to assign priorities for purposes of determining and distributing recoveries to holders of the TA Note and/or the CL Note and/or their designees in the event of a Multi-Note Loan default.

In a further embodiment of the present invention, a program product is provided for creating a loan from a revenue stream from a lessee, comprising machine-readable program code for causing a machine to perform the following method steps: determining rents from a lease of an asset; obtaining an indication of a value of the asset; obtaining a TA Note to tangible asset value ratio; obtaining an estimated Multi-Note Loan Coupon; calculating a Breakeven TA Note Rate; calculating a Breakeven TA Note Value for a TA Note using an algorithm that includes as factors the indication of value of the tangible asset, the Breakeven TA Note Rate, and the TA Note to tangible asset value ratio and appropriate debt service coverage ratio for the asset; calculating a CL Note Debt Service; obtaining a Breakeven CL Note Rate based in part on the market determined corporate bond spread for the lessee or its industry; calculating a Breakeven CL Note Value based on predetermined elements including the CL Note Debt Service, the Breakeven CL Note Rate and a term for the CL Note; calculating a Breakeven Multi-Note Loan Rate using the Breakeven TA Note Rate, the Breakeven CL Note Rate, TA Note Debt Service and the CL Note Debt Service as elements in the calculation; and calculating a Multi-Note Loan Coupon by adding a lender profit margin to the Breakeven Multi-Note loan Rate.

BRIEF DESCRIPTION OF THE DRAWINGS

FIG. 5 is a diagram of a screen shot display of a user interface for a computer program consistent with the teachings of the present invention.

FIG. 6 is a diagram of a screen shot display of a user interface for a computer program consistent with the teachings of the present invention for a 15 year lease.

DETAILED DESCRIPTION OF THE PREFERRED EMBODIMENTS

Figure 1:
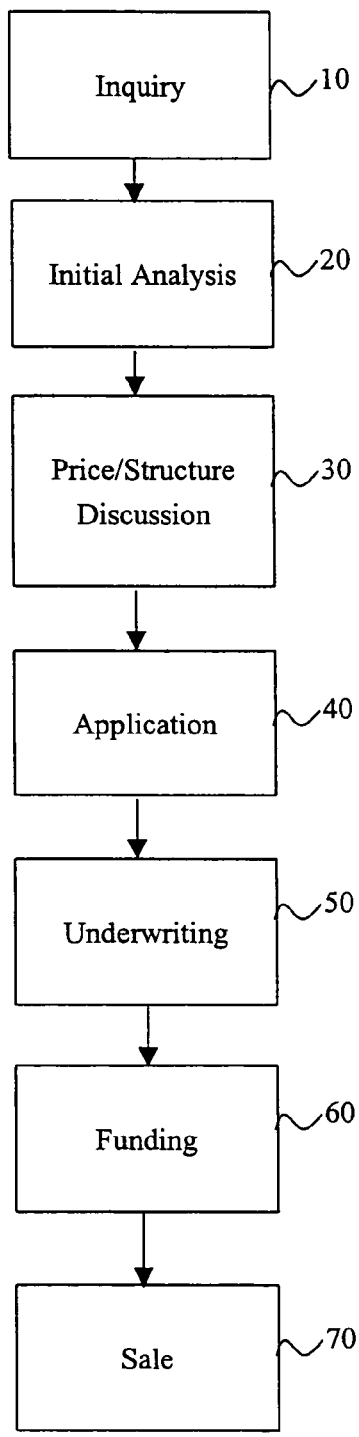
FIG. 1 is a schematic block diagram of a conceptualized operation of the present invention.

The present invention provides a method, program product and system that provides a loan structure that meets one or more of the following goals:
1. Creates securities which can be sold into deep and liquid markets;
2. Improves the certainty of execution in either the public or private capital markets;
3. Captures more efficiently the inherent value of loans which are backed by both highly rated credits and high quality real estate.
4. Offers substantially the same level of proceeds to a borrower as a 20 year fully amortizing CTL loan
5. For lease terms less than 20 years, offers significantly more proceeds to a borrower than a fully amortizing CTL loan of the same or similar term as the lease.

In a preferred embodiment, the present invention creates a loan with a new multi-note structure with a shorter term final maturity than traditional CTL loans, such as, for example, 10 years, and the following characteristics:
1. A Tangible Asset Note ("TA Note") supported by lease payments which may have typical fundamentals for that particular asset type (e.g., for real estate, for example, no more than 75%-80% loan to value ratio with an approximate 1.20 debt service coverage ratio or greater, a loan term for example of 10 years ("TA Note Maturity Term"), an amortization term for example of 25 years and a balloon payment at the end of the TA Note Maturity Term in the amount of the outstanding loan balance at the end of the TA Note Maturity Term which may be for example a loan to value ratio of approximately 60%) which may be placed into generic public (or private) capital market securitization transactions, such as generic real estate CMBS securitizations.
2. A credit lease backed note ("CL Note") supported by rent payments whose credit rating would be commensurate with the credit rating of the underlying tenant of the credit lease. The CL Note is a self-amortizing loan with a loan term no greater than the TA Note Maturity Term ("CL Note Amortization Term"). This note is created by monetizing the excess cash flow that would otherwise go to the borrower after debt service payments on the TA Note. These CL Notes may be issued, by way of example but not by way of limitation, into a generic Collateralized Bond Obligation ("CBO") securitization.
3. A clearly defined legal and electronic file structure that delineates asset recovery priority, asset disposition authority and priority of lease stream payments while maintaining the credit quality of each note and the associated cash flows. This legal and associated electronic structure may be provided, in a preferred embodiment, through an intercreditor agreement. Such an agreement is instrumental in assuring that the nationally recognized Rating Agencies ascribe a credit rating to the CL Notes commensurate with that of the credit rating of the underlying credit tenant.

The Loan Product/Structure Economics

Typically, a full term, fully leveraged 20 year CTL loan will be priced at an interest rate spread premium to that of the underlying interest rate spread of the senior unsecured debt of the corporation. For example, Company X may have a debt rating of BBB+ (S&P) while the senior unsecured bonds of the company may trade on the secondary market at a spread of 240 basis points over the average life U.S. treasury. The spread at which the CTL loan would trade in the CTL whole loan market would be approximately 50 basis points greater than that figure, or 290 basis points over the average life U.S. treasury. Consequently, the interest rate spread that might be charged to the borrower would most likely range from 300 to 315 basis points including a lender profit of 10 to 25 basis points. (The average life treasury for a 20 year self-amortizing loan would be approximately 13 years). If the 10 year on-the-run Treasury Note was yielding 5.20% and the 30 year on-the-run Treasury Bond was yielding 5.61% at the time the loan was made then the 13 year average life treasury would equal approximately 5.26% (based upon a 20 year straight line interpolation between 5.20% and 5.61%) and, based on a 300 basis point spread and the average life treasury, the coupon would equal approximately 8.26%.

The spread premium for the CTL loan over the senior unsecured bonds of the company is due primarily to the following reasons:

1. Lack of liquidity for the CTL loan as compared to the senior unsecured debt,
2. Lack of bond covenants for CTL loans, and
3. Constraints of the bankruptcy laws regarding leases.

Reference is made to the rents that are shown in FIG. 5 in the middle column. The rents could be fixed, as shown in the figure, or varying. Typically, with a full term, fully leveraged 20 year CTL loan, the entire rental payment from the tenant (except for double net leases where generally only 90-95% of the rental payments are monetized) would be monetized into a 20 year fully leveraged loan of approximately $9.9 million.

Using the example from above, utilizing a new Multi-Note Loan structure (the "Invention"), the loan proceeds are summarized in FIG. 5. Note that FIG. 5 is a screen shot that has been broken up into three figures in order to comply with the Office font requirements for drawings. By using the Multi-Note Loan structure, a loan that is comparable in terms of total loan proceeds to a traditional long term CTL loan can be obtained at better pricing to the borrower, determined as follows:

1. A TA Note is sized, by way of example but not by way of limitation, based upon a typical 75% LTV ratio with 1.25 DSCR at a 230 basis point loan spread ("Breakeven TA Note Spread") to the 10 year on-the-run Treasury (a typical real estate loan spread) and a typical 300 month amortization term ("TA Note Amortization Term") See FIG. 5b under the Lender column.
2. A second note, referred to as the CL Note, is created by monetizing the excess cash flow (the "Excess Cash Flow"), defined as the cash flow remaining after subtracting the cash flow needed to service the TA Note, deducting for any reserves, and deducting for any monthly cash to go directly to the borrower, and any other appropriate necessary amounts. This CL Note is created by discounting this Excess Cash Flow at a discount rate ("The Breakeven CL Note Rate") over the 120 month term of the CL Note. As this CL Note is a pure credit note, its price or spread is based on a premium to the interest rate spread ("Breakeven CL Note Spread") on the senior unsecured debt obligations of Company X. As this CL Note is even less liquid and somewhat more complicated than a regular CTL loan, the spread premium is approximately 100 basis points (rather than 50 basis points) greater than the senior unsecured debt of Company X. See FIG. 5a, the Corporate Spread line item of 2.400%, as compared to the Spread/Cost of Funds line item in the Credit Lease column of 3.400%, i.e., a 100 basis point difference.

The quoted loan spread to the borrower ("Borrower Multi-Note Loan Spread") under the Multi-Note Loan structure will be based upon, among other things, the Breakeven TA Note Spread and the Breakeven CL Note Spread. Assuming the same Treasury Curve as listed in FIG. 5 the cost of funds to CLF in the capital markets ("the Breakeven Multi-Note Loan Spread") resulting from these placements would be 242 basis points. This lower cost (compared to a typical 20 year CTL loan) can be passed on to the borrower resulting (after addition of a lender profit of 28 basis points) in a lower Borrower Multi-Note Loan Spread to the borrower of only 270 basis points which would generate a note coupon of 7.90%. The resulting loan proceeds of approximately $9.79 million are comparable to the loan proceeds under a 20 year CTL loan.

Referring now to FIG. 1, there is shown a schematic block diagram of the present invention at a high level of abstraction. Block 10 comprises a request from a borrower or mortgage correspondent broker for financing. The inquiry may be by telephone call, by mail, in person, or may occur automatically via the receipt of a lease electronically, or via the Internet.

In block 20, the lease (if not already obtained in block 10) and other pertinent information about the borrower, the property, the lease and the lessee are received from the borrower/correspondent. A determination is made based on appropriate criteria whether CTL or other financing is suitable for this property. Such criteria may include a minimum credit rating for the tenant/lessee to support credit tenant financing, for example BB+ or higher; the lease type and term, for example, a 15 year or longer lease term and NN, NNN or bond type lease; and objectives of the borrower, for example, does the borrower desire full leverage.

In block 30, a loan proposal is developed based on factors, such as the tenant/lessee credit rating, lease term and lease type. For example, stronger credits (A+ or higher) allow greater leverage and tighter loan spreads; a longer lease allows for a longer amortization schedule and greater proceeds, a NNN or bond type lease allows for a lower debt service coverage ratio. A term sheet for the Multi-Note Loan is then issued, the terms of which are based upon the combination of the TA Note and the CL Note.

In block 40, if the borrower/correspondent finds the loan proposal acceptable, then a loan application is issued, the borrower signs the application and, preferably, provides a deposit. In block 50, due diligence requirements are communicated, the loan undergoes an underwriting process and the borrower pays expenses related to the loan underwriting.

In block 60, upon completion of underwriting, the loan is subject to review by a credit committee. If the loan is approved, the loan is then funded and the borrower receives funds, net of the underwriting expenses and fees. In block 70, the TA Note and CL note(s) are sold individually or a plurality of the TA Notes are pooled and sold, and/or a plurality of the CL Notes are pooled and sold. The pooling and sale operation may be automated and/or performed using telecommunication with note buyers, including via the Internet.

Figure 2:
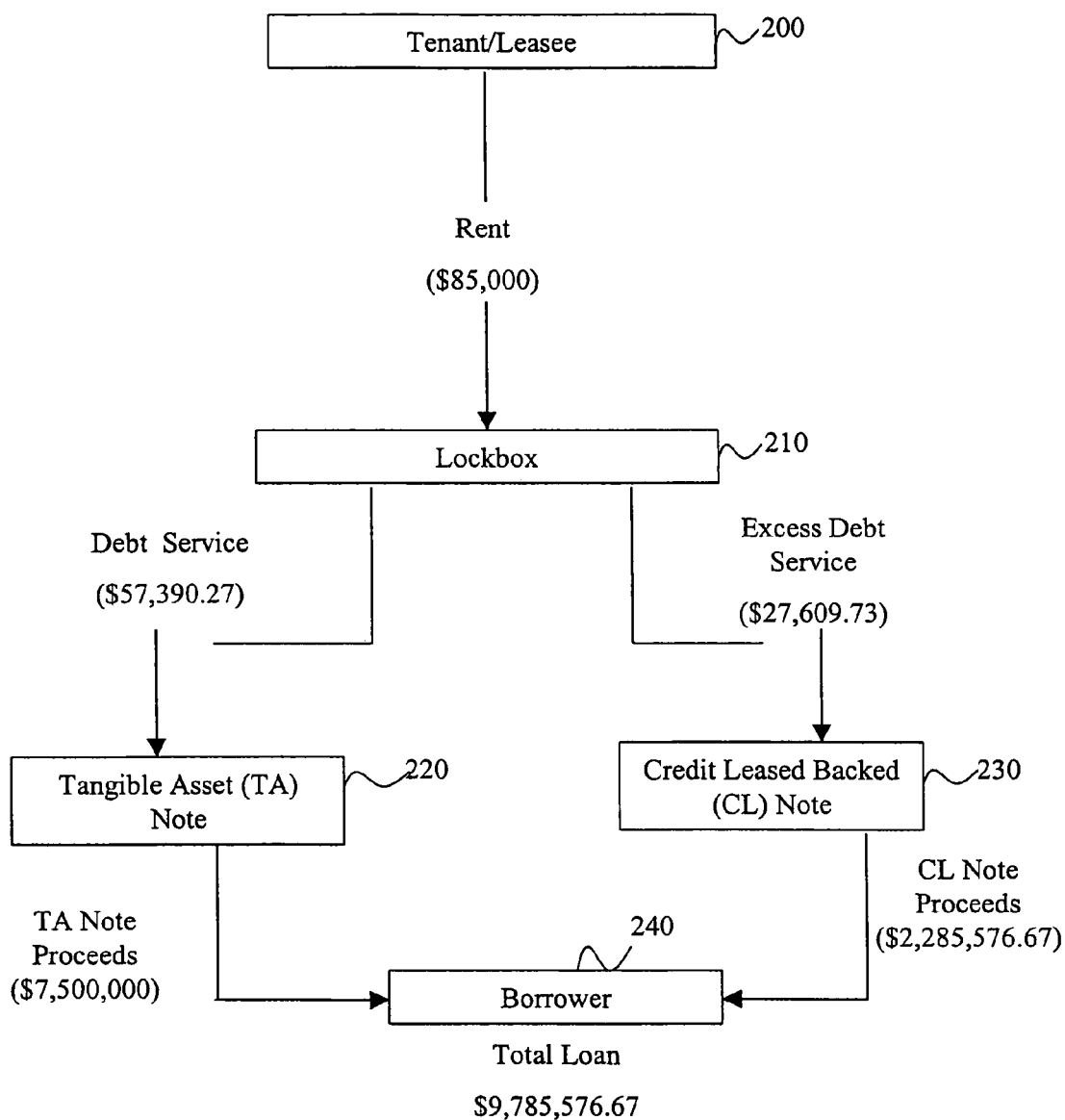
FIG. 2 is a schematic block diagram of a preferred embodiment of the present invention.

The basic operation of the method, program product and system of the present invention is shown, again at a high level of abstraction, in FIG. 2. In FIG. 2, a revenue stream of $85,000 per month comprising rent from a tenant/lessee 200 is used to create at least two notes. The revenue stream amount is paid into a lockbox 210 (an industry term indicating that the rent is to be paid directly to the designee of the noteholder) and then divided based first on paying the debt service on the TA Note that is based on an underwritten debt service coverage ratio, the TA Note Amortization Term, an underwritten TA Note to value ratio and the value of the asset being leased. In the example, shown in FIG. 2, the monthly debt service portion is $57,390.27, and is used to support a TA Note 220 of $7,500,000. The monthly Excess Cash Flow amount of $27,609.73 in this example is used to support a CL Note 230 of $2,285,576.67. The borrower 240 receives a loan based on the combined notes of $9,785,576.67 at a rate to be discussed below.

Figure 3:
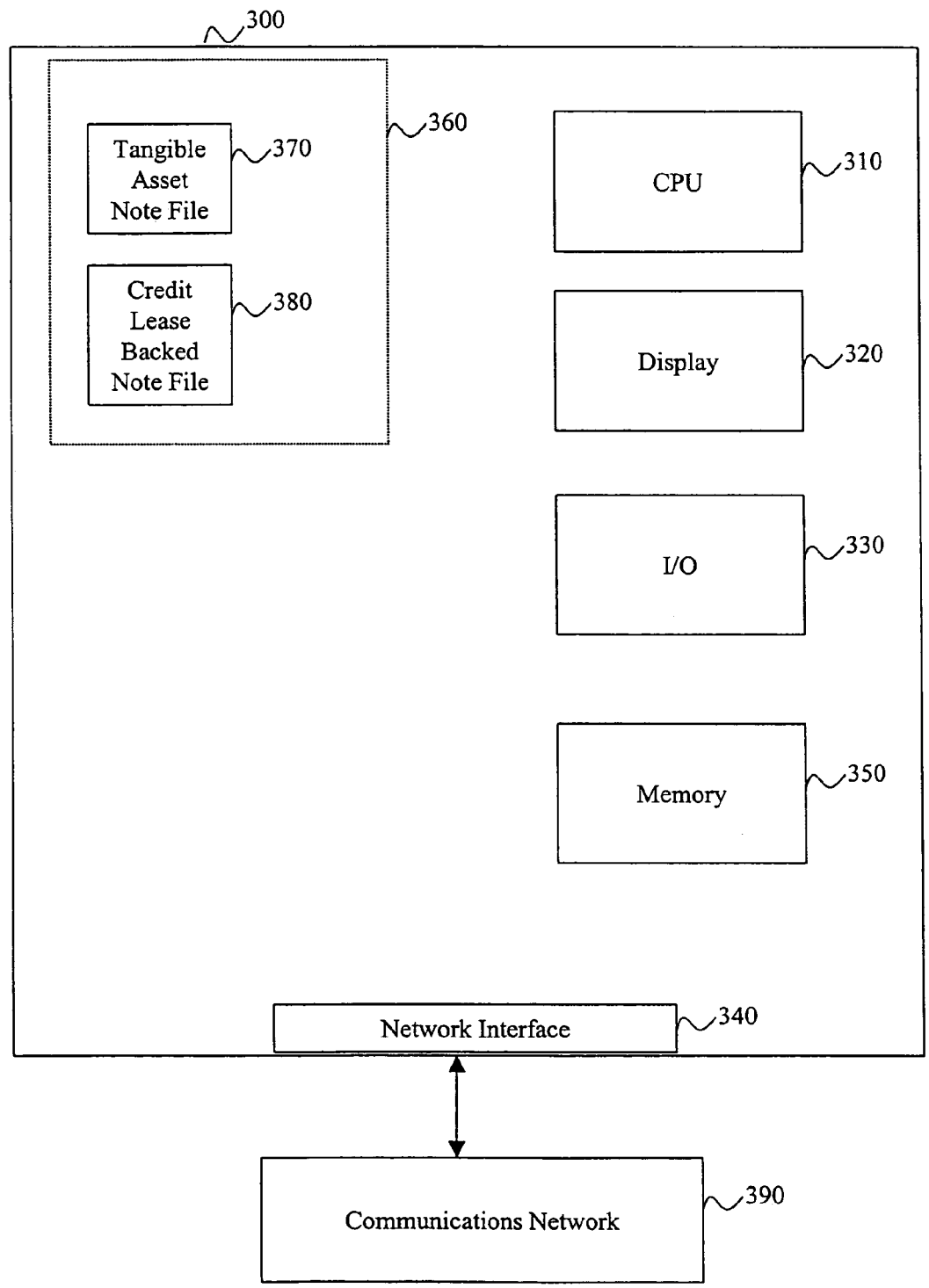
FIG. 3 is a block diagram of a computer system that may be utilized to implement the present invention.

Referring now to FIG. 3, there is shown an embodiment for implementing the processing system and method of the present invention. The processing system may, in one example, be implemented as a computer system 300 which includes all of the customary components of a computer system including a CPU 310; a display 320, a keyboard and/or other I/O device 330, a network or communications interface 340, RAM or ROM or other memory 350, as well as storage devices 360, which for example may be implemented by disk and CD-ROM drives or arrays for storing one or more electronic data bases. For purposes of explication only, the storage device 360 is shown, in one embodiment, with a file 370 for a TA Note, and a file 380 for a CL Note. It should be understood that the computer system 300 could also take a variety of other forms, such as a PDA, communications devices, such as a WAP enabled device, that communicates directly with processing software at one or more processing systems or at an intermediate computer server that communicates with a processing system, or various other convenient forms.

The computer system 300 could be connected through the communication interface 340 and via a communications network to one or more other processing systems. The processing software to be described below may be contained on computer 300 or in other remote processing systems using the communications network 390. In the preferred embodiment, the communication network might be the Internet. However, the communication network could also include a wide area network (WAN), internetwork, a public tariff telephone network or a private Value Added Network (VAN). Alternatively, the communication network can be implemented using any combination of these different kinds of communication networks. It should be appreciated that many other similar configurations are within the abilities of one skilled in the art and all of these configurations could be used with the method of the present invention. Furthermore, it should be recognized that the computer system and network disclosed herein can be programmed and configured in a variety of different manners, by one skilled in the art, to implement the method steps described further herein.

The storage and databases for the method may be implemented by a single data base structure at an appropriate site, or by a distributed data base structure that is distributed across an intra or an Internet network.

It should also be noted that a single CPU based computer system is shown for clarity in the figure. One skilled in the art would recognize that the processing system 300 is representative only and could be implemented using a multi-processor computer system. Alternatively, a distributed computer system could be implemented in which the functionality of the processing system could be provided by several computer systems that are connected over a computer network. It is also possible to distribute the functionality of the processing system over a multitude of sites which are suitably connected together using conventional networking or inter-networking techniques.

Furthermore, it should be recognized that the computer system and network disclosed herein can be programmed and configured in a variety of different manners by one skilled in the art, to implement the method steps discussed further herein.

The files and file components discussed herein may be paper files, but in a preferred embodiment comprise data structures with electronic data which may be implemented by one or a plurality of files and subfiles with appropriate electronic associations. The files or subfiles may be located in one computer or may be distributed in a plurality of local and/or remote computers across a network. The number of files and the manner of distribution among computers and across a network and the method of association is a design feature that may be chosen by the system designer.

Figure 4:
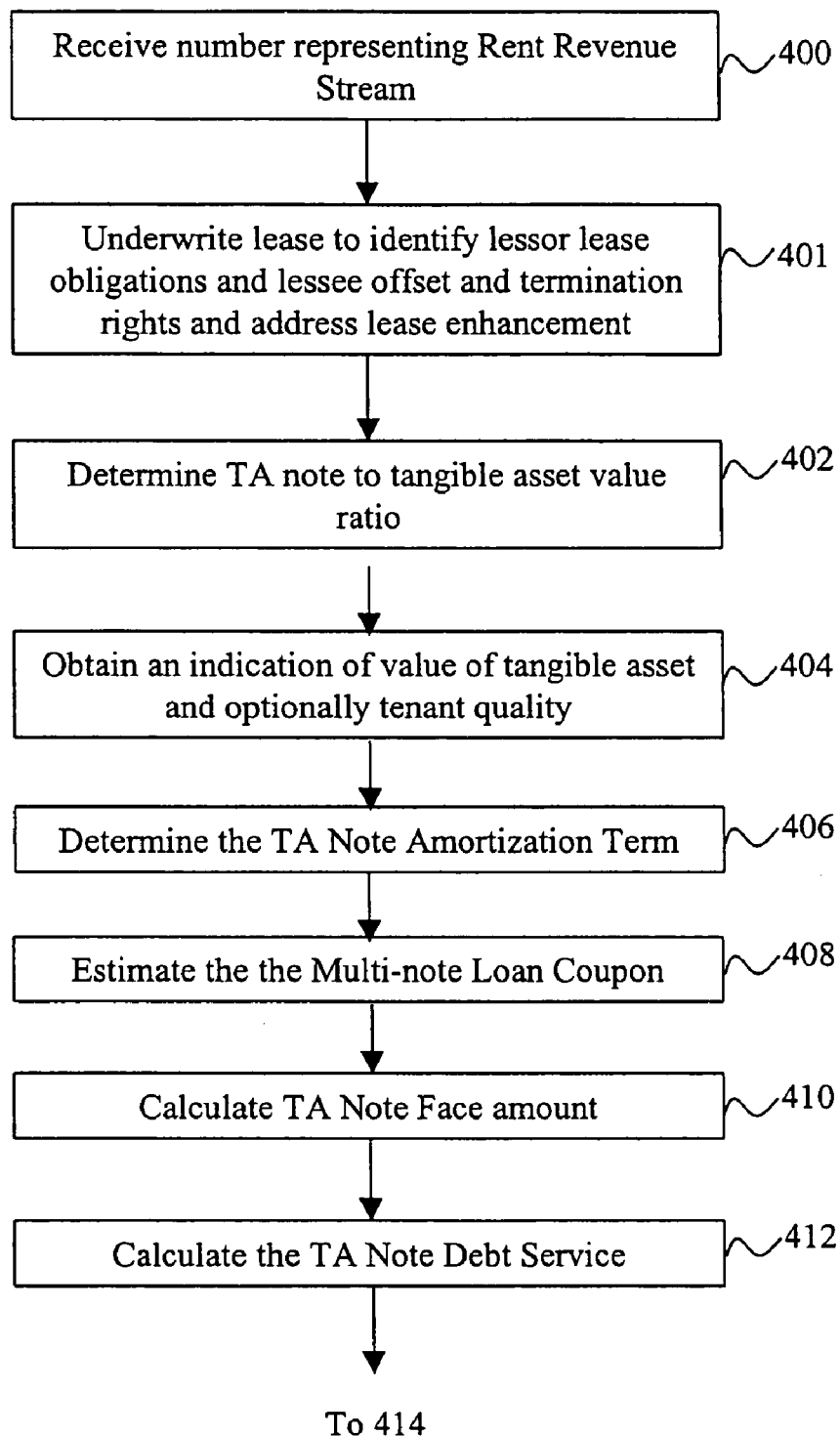
FIG. 4 is a flowchart of a preferred embodiment of the method of the present invention.

Referring now to FIG. 4, there is shown a schematic block diagram of a preferred embodiment of the present invention. It is contemplated that at least one, and preferably a plurality of the method steps-to be disclosed herein be performed via the computer implementation of FIG. 3, but may be performed in a different order than as shown in the exemplary figure. In block 400 a revenue stream amount is obtained for a lease of a tangible asset in order to facilitate a Multi-Note Loan to a borrower. In one embodiment, the tangible asset is real estate and the revenue stream is rent from the tenant/lessee to a borrower. A screen shot of a graphical user interface of a computer program designed to perform one or more of these steps is shown in FIG. 5A-5C, using an example of real estate being leased under a 20 year lease by a Company A for a predetermined retail store use. FIG. 5A-5C comprises a single screen shot that has been broken up to comport with drawing requirements for the application. (Note that the underwriting parameters will change for different assets.) In the example, Company A has a Moody's Rating of A2, and an S&P Rating of BBB+, and a Lease Type of NNN. The revenue stream of rent is $85,000 per month (Monthly Lease Payment slot in FIG. 5A) over the entire 240 month lease term in the present example. As noted above, the rent may be a fixed amount per time period, or may vary.

In block 401, in the event that the lease is not a bond lease, steps are taken to underwrite the lease. This process comprises identifying lessor maintenance and other obligations and lessee offset and termination rights and utilizing appropriate lease enhancement mechanisms to mitigate risk of potential termination of or interruption in the lease payments due to the failure of the lessor to perform its obligations or for other causes that might cause such an interruption. By way of example but not by way of limitation, such a lease enhancement mechanisms might comprise subtracting from the revenue stream and escrowing a reserve to assure adequate resources for the lessor to perform its maintenance obligations. Additionally, this block would also encompass subtracting amounts from the Multi-Note Loan proceeds for the payment of the premiums for casualty and condemnation insurance and other appropriate insurance. The foregoing steps may be taken in order to enhance a lease other than a bond lease to bond type status allowing such lease to support a traditional CTL financing and a financing under the Multi-Note Loan structures of the present invention. Note that this step is optional and may not be necessary for some leases such as bond leases.

The next step, represented by block 402, comprises determining a TA Note to tangible asset value ratio. This ratio is generally an input that is market-determined, based on factors such as the tangible asset type, location, demographic profile, credit rating of the lessee, the lease term, and other factors. In FIG. 5C, the note to asset ratio for real estate for purposes of this example, shown next to the heading Maximum LTV, is 75%.

The next step in the diagram, as represented by block 404, is to obtain an indication of the value of the tangible asset that is being leased. By way of example, this indication of value could be obtained by an appraisal of the tangible asset, or simply by estimating the value of the tangible asset or by some other convenient means. In the example of FIG. 5, the indication of value, shown next to the heading Appraised Value, is $10,000,000 in FIG. 5A.

The next step shown in the diagram, represented by block 406, is to determine the TA Note Amortization Term. This amortization term is generally a given input that is market-determined, based on factors such as the tangible asset type, location, demographic profile, credit rating of the lessee, the lease term, lease type and other factors. In FIG. 5B, the TA Note Amortization Term for real estate for purposes of this example, shown next to the heading Term/Amortization in the column titled Lender is 300 months The next step shown in the diagram, represented by block 408, is to estimate the Multi-Note Loan Coupon, (i.e., the interest rate charged to the borrower). An estimate, based on market parameters, of the Multi-Note Loan Coupon is made which incorporates a lender's profit margin. In FIG. 5B, the Multi-Note Loan Coupon for real estate for purposes of this example, shown next to the heading Coupon-in the column titled Tangible Asset is 7.90%.

Note that due to the multi-note structure, in a preferred embodiment the calculations are performed by working backwards in structuring the Multi-Note Loan by starting with an estimate of the Multi-Note Credit Loan Coupon. Using such an example calculation, the various other parameters for the multi-note loan are calculated. Finally, the Multi-Note Credit Loan coupon is calculated, rather than estimated. Then this calculated Multi-Note Credit Loan Coupon is reviewed to determine if a satisfactory margin is obtained with that coupon interest rate level and whether the other parameters in the calculation are acceptable. In a preferred embodiment, if the resulting margin or another parameter is not acceptable, then this calculated Multi-Note Credit Loan Coupon is plugged back in and the individual note parameters are recalculated in an iterative process using the calculated Multi-Note Credit Loan Coupon figure.

By way of example but not by way of limitation, in a typical real estate loan, a lender sets the coupon on the loan marginally higher than the breakeven rate on the loan to establish the lender's profit. Both the coupon and the breakeven rate are applied to the same set of debt service payments. In the Multi-Note Credit Loan, the Breakeven Multi-Note Credit Loan Rate is based on two distinct breakeven rates, the Breakeven TA Note Rate and the Breakeven CL Note Rate, two distinct amortization terms, the TA Note Amortization Term and the CL Note Amortization Term, and two distinct sets of debt services payments, the TA Note Debt Service and the CL Note Debt Service. The Multi-Note Loan Coupon is initially estimated at a premium to the Breakeven Multi-Note Credit Loan Rate to establish the lender's profit. However, as one or more of the parameters upon which any of the calculations are based changes as the result of changes in market parameters, the TA Note Debt Service and CL Note Debt Service, among other things, also change, resulting in changes to the Multi-Note Loan Coupon. This, in turn, may cause the Breakeven Multi-Note Loan Rate to change. This creates an iterative process for structuring the loan whereby adjustments to the Multi-Note Loan Coupon are made causing, in some instances, a recalculation of the Breakeven Multi-Note Loan Rate one or more times in order to structure the Multi-Note Loan with the desired level of profitability.

The next step shown in the diagram, represented by block 410, is to calculate the TA Note Face Amount based on the required TA Note to tangible asset ratio and the value of the tangible asset. Using the TA Note to asset ratio of 75% and an indication of value for the tangible asset of $10,000,000, the TA Note Face Amount would be $7,500,000. This TA Note Face Amount is shown in the Face Amount Of Note row in the Tangible Asset column of FIG. 5B.

The next step shown in the diagram, represented by block 412, is to calculate the TA Note Debt Service (the monthly payment to service the loan, including interest and principal and the final balloon payment due at the end of the TA Note Term). The calculation of the TA Note Debt Service is determined based upon predetermined elements including: the estimate of the Multi-Note Loan Coupon, the TA Note Amortization Term and the TA Note Face Amount. The calculated TA Note Debt Service may then be tested to verify that the required minimum debt service coverage ratio is adequate such that the calculated TA Note Debt Service coverage ratio is greater than a minimum required debt service coverage ratio, which is a market input based on factors such as the tangible asset type, location, demographic profile, credit rating of the lessee, the lease term, lease type and other factors. An algorithm that may be used to calculate the TA Note Debt Service in a preferred embodiment is as follows:

$$TA \text{ Note Debt Service} = TA \text{ Note Face Amount} * \left( \frac{i*(1+i)^n}{(1+i/12)^n - 1} \right)$$

where $n = TA$ Note Amortization Term $i =$ Multi-Note Credit Loan Coupon (Note: This method is the preferred embodiment however there is a variety of other methods to calculate this TA Note Debt Service. By way of example but not by way of limitation, such other methods might be based on such factors as varying the calendar used for the payment calculations, and varying the payment period.)

The next step in the diagram, represented by block 414, comprises determining a Breakeven TA Note Spread. This Breakeven TA Note Spread is a market-determined input based upon a number of different criteria, which will depend on the tangible asset involved, but typically might include the tangible asset type, location, demographic profile, credit rating of the lessee, the lease term, lease type, amortization term, loan term, prevailing capital markets asset interest rate spreads and other factors. For example, for a real estate asset, the spread would be determined, in part, based on whether the real estate was for a retail, office, or other use and is generally a market determined input. In the example, the market-determined input for the Breakeven TA Note Spread, shown in the Spread/Cost of Funds row in the Tangible Asset column, is 2.30% in FIG. 5B.

The next step in the diagram, as represented by block 416, is to obtain a Breakeven TA Note Rate. The Breakeven TA Note Rate may be determined based on the Breakeven TA Note Spread determined in block 414 and a benchmark interest rate. The benchmark rate may be any standard benchmark, such as a U.S. Treasury interest rate, for example, the 5 year or 10 year on-the-run US Treasury interest rates, or the LIBOR rate for 1 week, 1 month, or 2 month, etc. Referring to FIG. 5B, the benchmark interest rate used in the present example is shown in the Base Treasury Rate row in the Tangible Asset column as 5.20% (10 year on-the-run US Treasury). The Breakeven TA Note Spread in FIG. 5B, listed in the Spread/Cost of Funds row in the Tangible Asset column, is 2.30%. Accordingly, the Breakeven TA Note Rate is 7.50%, shown in FIG. 5B in the Discount Rate row in the Tangible Asset column.

The next step in the diagram, represented by block 418, comprises calculating a Breakeven TA Note Value amount based on predetermined elements, including the TA Note Debt Service, the Breakeven TA Note Rate, and the loan term for the TA Note. By way of example but not by way of limitation, this calculation could comprise determining the present value of the amount of the TA Note Debt Service at the calculated Breakeven TA Note Rate. The calculated Breakeven TA Note Value amount in the screen shot example is $7,695,437.10, and is shown in the Loan Value row in the Tangible Asset column of FIG. 5B. An algorithm that may be used to calculate the Breakeven TA Note Value is as follows:

$$\text{Breakeven } TA \text{ Note Value} = \sum_{x=1}^{n} \left( \frac{TA \text{ Note Debt } Service_x \text{ (including balloon amount)}}{(1 + i/12)^x} \right)$$

where $n = TA$ Note loan Term $i = $ Breakeven $TA$ Note Rate (Note: This method is the preferred embodiment however there is a variety of other methods to calculate this Breakeven TA Note Value. By way of example but not by way of limitation, such other methods might be based on such factors as varying the calendar used for the payment calculations, and varying the payment period.)

The next step in the diagram, as indicated by block 420, comprises calculating the Excess Cash Flow (also referred to as the CL Note Debt Service), defined as the cash flow remaining after subtracting the TA Note Debt Service (as calculated in Block 412), and deductions for any reserves, any cash going directly to the borrower, and any other appropriate amounts from the lease revenue stream. The following is a description of a preferred methodology that may be used in determining the amounts available for debt service for both the TA Note and the CL Note in Multi-Note Loans secured by real estate:

If there are no monetary lessor obligations under the lease (a "Bond/NNN Lease"), including, without limitation, for maintenance, repair, environmental remediation or correction of latent defects, then 100% of the rent is available to be applied to debt service for all notes of the Multi-Note Loan.

If there are monetary lessor obligations under the lease (a "NN Lease"), then the total rent is divided by 1.05 and the quotient (the "Debt Service Quotient") of such calculation is the amount available to be applied to the debt service and any monthly reserves on all notes of the Multi-Note Loan.

The difference obtained by subtracting the Debt Service Quotient from the total rent is cash which is generally released to the Borrower each month (the "Borrower Monthly Cash") after payment of debt service and reserves for all notes of the Multi-Note Loan.

The amount available for debt service for the Multi-Note Loan (the "Multi-Note Loan Debt Service") is either (a) for a Bond/NNN Lease, 100% of the rent, or (b) for a NN Lease, the difference obtained by subtracting all monthly reserves from the Debt Service Quotient.

The TA Note is created based upon appropriate underwriting parameters for the particular asset securing the Multi-Note Loan as more particularly described above and is to be serviced by a portion of the Multi-Note Loan Debt Service (the "TA Note Debt Service").

The CL Note, which will be serviced by the difference obtained by subtracting the TA Note Debt Service from the Multi-Note Loan Debt Service (the "CL Note Debt Service") is then created based upon the methodology more particularly described.

The next step in the diagram, represented by block 422, is to calculate a Breakeven CL Note Spread and Breakeven CL Note Rate. By way of example but not by way of limitation, the Breakeven CL Note Spread may be calculated by adding a premium (in this example 100 basis points) to the lessee's corporate bond interest rate spread as determined in the marketplace. For example, in the screen shot of FIG. 5B, the corporate bond interest rate spread for the particular lessee Company A with an S&P corporate bond rating of BBB+ is shown in the Spread/Cost Of Funds row in the Credit Lease column as 3.40%, which is a 100 basis point premium over the actual corporate bond spread of Company A, which is 240 basis points, as shown in the row labeled "Corporate Spread" in FIG. 5A. Referring again to FIG. 5B, the benchmark interest rate used in the present example is shown in the Base Treasury Rate row in the Credit Lease column as 4.80%. In this example calculation as noted earlier, the Base Treasury Rate of 4.80% is obtained by performing a straight-line interpolation of the 5 year Treasury Curve (4.74%) and the 10 year Treasury Curve (5.20%) based on an average life of the CL Note of 5.7 years. Accordingly, the Breakeven CL Note Rate, which is the sum of the Breakeven CL Note Spread and the Base Treasury Rate, is 8.20% in this example.

Alternatively, the corporate bond spread to be added to the benchmark rate in block 422 could be a generic corporate bond spread based on the debt rating and/or other factors for the tenant/lessee or it could be another convenient spread.

The next step in the diagram, represented by block 424, comprises calculating the CL Note Face Amount based on predetermined elements, including the CL Note Debt Service, the Multi-Note Credit Loan Coupon, and the CL Note Amortization Term. By way of example but not by way of limitation, this calculation could comprise determining the present value of the amount of the CL Note Debt Service discounted at the Multi-Note Credit Loan Coupon over the CL Note Amortization Term. The calculated CL Note Face Amount in the screen shot example of FIG. 5B is $2,285,576.67, shown in the row in the Credit Lease column.

The next step in the diagram, represented by block 426, comprises calculating a Breakeven CL Note Value amount based on predetermined elements, including the CL Note Debt Service, the Breakeven CL Note Rate, and the CL Note Amortization Term. By way of example but not by way of limitation, this calculation could comprise determining the present value of the amount of the CL Note Debt Service discounted at the calculated Breakeven CL Note Rate. The calculated Breakeven CL Note Value amount in the screen shot example of FIG. 5B is $2,255,936.95, shown in a row in the Credit Lease column. An algorithm that may be used in a preferred embodiment to calculate Breakeven CL Note Value is as follows:

$$\text{Breakeven } CL \text{ Note Value} = \sum_{x=1}^{n} \left( \frac{CL \text{ Note Debt } Service_x}{(1+i/12)^x} \right)$$

where $n = CL$ Note Amortization Term $i = $ Breakeven $CL$ Note Rate (Note: This method is the preferred embodiment however there is a variety of other methods to calculate this Breakeven CL Note Value. By way of example but not by way of limitation, such other methods might be based on such factors as varying the calendar used for the payment calculations, and varying the payment period.)

The next step in the diagram, as represented by block 428, comprises calculating a Breakeven Multi-Note Loan Rate. The Multi-Note Loan is based on predetermined elements comprising the Breakeven TA Note Rate, the TA Note Debt Service, the Breakeven CL Note Rate and the CL Note Debt Service. The Breakeven Multi-Note Loan Rate, in a preferred embodiment, is the approximate interest rate which, when applied to the Multi-Note Loan Debt Service, produces a present value equal to the sum of the present value of the TA Note Debt Service discounted at the Breakeven TA Note Rate over the TA Note Maturity Term and the present value of the CL Note Debt Service discounted at the Breakeven CL Note Rate over the CL Note Amortization Term. In FIG. 5B, the present value of the TA Note Debt Service is $7,695.437.10, i.e., the Breakeven TA Note Value, when discounted at the Breakeven TA Note Rate of 7.50%. The present value of the CL Note Debt Service payments is $2,255,936.95, i.e., the Breakeven CL Note Value, when discounted at the CL Note interest rate of 8.20%. The sum of the present values for the two notes is $9,951,374.06. A discount rate of approximately 7.620% is required to produce a present value of $9,951,374.06 for the Multi-Note Loan Debt Service. This resulting Breakeven Multi-Note Loan rate is shown in the Lender column next to the Discount Rate row. A variety of other methods are available to calculate the Breakeven Multi-Note Loan Rate. Such other methods would use one or more of the predetermined elements of the Breakeven TA Note Rate, the TA Note Debt Service, the Breakeven CL Note Rate and the CL Note Debt Service as elements in the calculation.

The next step in the diagram, represented by block 430, comprises calculating the Multi-Note Credit Loan Face Amount, which is the sum of the TA Note Face Amount and the CL Note Face Amount. The calculated Multi-Note Credit Loan Face Amount in the screen shot example of FIG. 5B is $9,785,576.67, shown in the Face Amount of Note row in the Lender column.

The next step in the diagram is to add an estimated margin to the Break Even Multi-Note Loan Rate to obtain a calculated Multi-Note Loan Coupon intended to incorporate a desired level of lender profit. The calculated Multi-Note Loan Coupon is then plugged back into block 408 and the parameters for the TA Note and the CL Note are recalculated in an iterative process. This operation may be repeated multiple times, as necessary to fine tune the Multi-Note Loan Coupon to generate the desired level of lender profit. The foregoing operation is represented by block 432.

A further step could be implemented, represented by Block 432 in the diagram, to improve the efficiency of a CMBS securitization, a CBO securitization, a loan sale transaction, or for other reasons, whereby the Multi-Note Loan Coupon is reset at an annual rate which is lower than the original Multi-Note Loan Coupon, and the Multi-Note Loan Face Amount is recalculated based on such reduced Multi-Note Loan Coupon (a "Loan Gross-Up",) without (a) reducing the loan proceeds received by the borrower or (b) increasing the combined debt service payments for the TA Note and the CL Note. In one embodiment, the Multi-Note Loan Coupon would be reset at a lower annual interest rate (e.g. 25 basis points lower, depending on market conditions) and the Multi-Note Loan Face Amount would be recalculated in the same manner set forth above using such lower annual interest rate, which could have the effect of improving the execution and marketability of the loan by among other things, artificially creating a discount to par note.

FIG. 6 is a screen shot of a GUI for a computer program in accordance with the present invention, using an example of a 15 year lease to a property owner whose property is net leased to Company B. The same headings are used as with FIG. 5. Reference is made to the rents that are shown in FIG. 6A in the middle column. The rents could be fixed, as shown in the figure, or varying. Typically, with a full term, fully leveraged 15 year CTL loan, the entire rental payment from the tenant (except for double net leases where generally only 90-95% of the rental payments are monetized) would be monetized into a 15 year fully leveraged loan of approximately $8.8 million.

Using the example from above, utilizing a Multi-Note Loan structure, the loan proceeds are summarized in FIG. 6. By using the Multi-Note Loan structure, a loan amount of approximately $9.3 million is obtained, which exceeds the loan amount generated by a 15 year fully amortizing CTL loan of approximately $8.8 million.

The next step in the diagram, represented by block 434, comprises selling the TA Note and/or the CL Note. This step could comprise pooling a plurality of the TA Notes, securitizing and selling the resulting security, and/or pooling a plurality of the CL Notes, securitizing, and then selling the resulting security. The pooling could be performed manually, or automatically, and could be performed on the web using appropriate web content downloaded from a web site, as noted below.

An additional step represented by block 436, is comprised of creating an interactive web site with web content to accept input information from a potential borrower, calculate the Multi-Note Loan Face Amount based on determinations of a TA Note and a CL Note as described above and then determining the Multi-Note Loan Coupon. The screen shot of the interface shown in FIG. 5 could be used as the interface for the web site. Alternatively or in addition, the calculated Multi-Note Loan Face Amount and Multi-Note Loan Coupon could be transmitted to a predetermined location using a predetermined medium, such as email, fax or telephone, for example.

A further step could be performed using web content, wherein TA Notes and CL Notes are displayed to a potential aggregator or buyer, who may then aggregate various TA Notes into a pool and various CL Notes into a pool.

Note that an important component in a preferred embodiment of the present invention comprises using an intercreditor agreement to associate legally and in a preferred embodiment electronically, the TA Note and the CL Note together for various purposes including: (i) determining/calculating and distributing the proceeds from a foreclosure on the leased tangible asset, e.g. typically real estate and (ii) allocating the rights and responsibilities of the holders of such notes. The association of the notes would comprise, in one embodiment, creating one or more files for a TA Note and a CL Note, and on the occurrence of a sale of the leased tangible asset, calculating an excess of sale proceeds over at least amounts due for the payoff of the TA Note. In a preferred embodiment, the amount of the TA note would be paid off and other required amounts thereunder settled, and then the excess of the sale proceeds would be associated electronically or otherwise with the file for the CL Note. The further step of actually transferring the calculated excess amount to a holder of the CL Note or to another appropriate party could then be performed in one embodiment. In a preferred embodiment, the one or more files would be electronic files and the association would be by means of references, and the calculation and transfers would be performed electronically.

A further important aspect of the invention and the intercreditor agreement is to associate electronically or otherwise a claim for rents under the bankruptcy code after rejection of the tangible asset lease in bankruptcy or other claim for rents and/or other amounts due under the tangible asset lease after default thereunder, (collectively a "Defaulted Lease Claim") with the CL Note. This embodiment might also include the step of electronically associating any proceeds from the Defaulted Lease Claim with the file for the CL Note. In a preferred embodiment, the amount of the CL note would be paid off and other required amounts thereunder settled, and then the excess of the Defaulted Lease Claim proceeds would be associated electronically or otherwise with the file for the TA Note. An example intercreditor agreement is shown in the Appendix.

Internet Broadcasting

The present invention also includes providing a computer implemented method for providing loan services in accordance with the present invention over the Internet, including Internet broadcasting or video streaming to deliver information and services requested by clients. This concept includes providing an electronic calculator by downloading web content from a web site for calculating the various loan amounts, rates, and other terms disclosed herein.

Internet broadcasting is a generic term that covers both live one-way or two-way video and access to other on demand material, whether video or not, that a user can request. Therefore, the present invention includes using Internet broadcasting to explain, market, sell, and assist people to obtain loan services products from banks, brokerage firms, mutual funds, insurance companies, etc. Thus the client's questions or information requests could be answered by a video of a person or a live person.

SMIL

"SMIL" is a technology whose abbreviation stands for Synchronized Multimedia Integrated Language, which is free software that can be downloaded and allows both Internet broadcasting and data display of a form at the same time on a computer screen. In other words the client can see the person who is helping fill out the form at the same time as filling out the form.

The broadcasting site or Internet server can stream video, still photos, data, charts, images, and text at the same time for side-by-side display. This may be used for loan service products, banks, mutual funds, stock brokerage firms, etc.

LINKS

The present invention also includes providing clients with loan services through an internet website including providing hot links which automatically take the client to another web page of the provider or of a third-party for information or calculations requested by a client.

These technologies include media-on-demand which works by having a button or other indicator on the web site, which when clicked, links (or hot links) to another server, which maintains a mirror of the web site web page, and provides a stream or broadcast of the requested content. The reason this technology is preferable relative to importing just the stream or feed into the provider's web site is that when changes are made by the provider of the media-on-demand, the changes can be automatically adjusted at the media-on-demand web site and there is no need to keep adjusting the provider's web site every time there is a change at the media on demand server.

Therefore, the present invention includes the use of hot links in loan service products to explain, assist, sell, market or cause Internet broadcasting to be used to sell a loan services product. Whether the link is to a mirrored site on another server or simply imports data, pictures or other information from another site, these are all included in the present invention.

Accordingly, the present invention contemplates the use of hot links to cover banks, brokerage firms, mutual funds, all other types of financial institutions, insurance companies, their agents, and certainly anyone who markets a loan product including an Internet portal (e.g., AOL).

As an alternative or in addition, the web site could be used as a tool to allow a buyer of notes to interactively assemble TA and CL Note pools for securitization and purchase.

Structure

The inherent value of the Multi-Note Loan structure implemented in accordance with the present invention is that it is able to satisfy one or more of the following constituents while at the same time meeting their exacting standards:

Borrowers—the Multi-Note Loan structure generates similar loan proceeds to those generated by a 20 year fully amortizing CTL loan, which makes it a viable loan product.

Rating Agencies—in senior/subordinate A/B loan structures, the B Notes take many different forms. For instance, the B notes may take the form of mezzanine debt, preferred equity or hard and/or soft second mortgage notes. The rating agencies evaluate this form of additional indebtedness, as increasing the risk profile of the loan while also adding an additional layer of complexity. Consequently, the rating agencies, when rating a loan (or pool of loans), typically ascribe a higher subordination level to loans using a traditional senior/subordinate loan structure to compensate for the additional indebtedness. This means that a greater percentage of the loan (or pool of loans) will be rated below "AAA" as a result of the additional indebtedness.

The Multi-Note Loan structure of the present invention is unique because it generates substantially fully leveraged loan proceeds (i.e. loan proceeds similar to a traditional CTL loan at debt service coverage ratios ranging from approximately 1.0 to approximately 1.05 times) while at the same time achieving more favorable treatment from the Rating Agencies than traditional CTL loans and other senior/subordinate loan structures. Because the intercreditor agreement between the holders of the CL Note and the TA Note clearly delineates the sources and priority of tangible asset recovery in the event of a default, and maintains the credit quality of the cash flows from the underlying credit tenant's lease, the Rating Agencies can treat the Multi-Note Loan structure more favorably than traditional senior/subordinate loan structures and apply the following treatment to the Multi-Note Loan structure:

At worst, ascribe a normal subordination level consistent with those loans that are similar to the TA Note and, at best, ascribe a "shadow" or "rating estimate" equal to (or slightly lower than) the credit rating of the underlying lessee for the TA Note; and Ascribe a "shadow" or "rating estimate" equal to the credit rating of the underlying lessee for the CL Note.

Tangible Asset/Conduit Lenders—as the majority of the economics of the loan reside with the TA Note, which will be contributed to or placed into generic public (or private) capital market securitization transactions, such as generic real estate CMBS securitizations in the present example, the Multi-Note Loan structure should conform to the standards of the tangible asset/Conduit lenders. The Multi-Note Loan structure satisfies these investors because it meets or exceeds their requirements in terms of:

LTV ratio;
DSCR ratio;
Asset type;
Loan underwriting, structure and terms; and

It also meets or exceeds their requirements for tangible asset recovery in terms of disposition authority and priority. In the event of a default, the source of recovery for the tangible asset lender is the tangible asset.

CBO investors—as these types of investors are purely fixed income and credit/bond oriented and not tangible asset knowledgeable, the CL Note product should "look and feel" like a bond of a credit tenant. The Multi-Note Loan structure satisfies these investors as it provides for regular uninterrupted scheduled payments from the credit tenant and delineates tangible asset recovery and priority of claims in the inter-creditor agreement. The CL Note holder has first priority in the unsecured claim in bankruptcy under Section 502 (b)(6) of the Bankruptcy Code for the remaining rent due under the lease and any other claims for rent due under a defaulted loan. The priority of this claim is exactly or substantially the same as priority of the claim of senior unsecured bondholders.

"B" piece buyers—the "B" piece buyers are the holders of the most junior certificates in the tangible asset/conduit securitization. As such, they are in the first loss position of the securitization and the holders of the riskiest class of bonds. The universe of "B" piece buyers is very limited, amounting to only a few investors. They are influential with the tangible asset/conduit lenders as to the composition of the tangible asset/conduit securitizations and have the power to have certain loans removed from a tangible asset/conduit loan securitization. The TA Note generated by the inventive Multi-Note Loan structure described herein substantially meets tangible asset/conduit securitization standards as more particularly described above and are thus acceptable to the various "B" piece buyers.

Inter-Creditor Agreement

The inter-creditor agreement, as described previously, is a document which governs the rights between the TA Note and CL Note holders. The inter-creditor agreement, in a preferred embodiment, accomplishes the following:

assigns most of the rights and responsibilities with respect to the tangible asset, lease modifications, loan workouts, property protection advances, and other tangible asset/real estate collateral related matters to the TA Note holder;

addresses the allocation of recoveries amongst the two note holders;

provides first priority recovery under the tangible asset to the TA Note holder; and provides first priority recovery under Section 502 (b)(6) of the US Bankruptcy Code and any other Defaulted Lease Claims to the CL Note holder.

provides first priority of lease payments to the TA Note

The structure of the present invention, in the example shown, provides proceeds to a borrower that are similar to those generated by a fully amortizing 20 year CTL loan, while at the same time meeting the requirements and standards of the various parties involved in the disposition of both notes in the capital markets.

Benefits

The benefits of the Multi-Note Loan structure for lenders include one or more of the following:

1. Enables the sale of securities into two deep and liquid markets (i.e. placed into generic public (or private) capital market securitization transactions, such as generic real estate CMBS securitizations and generic CBO securitizations; and
2. Improves the certainty of the sale of the resulting notes generated in accordance with the present method and system.

The benefits of this new structure for borrowers may include one or more of the following:

1. Creates liquidity for properties leased to certain types of lessees for which full leverage financing is generally not available due to an oversupply in the marketplace. These credits would include most drug store credits such as CVS Corporation and Walgreen Co. Currently, most life insurance companies and pension plans have completely depleted their allocations for such credits, and there is little or no additional mortgage financing available for these credits in the marketplace.
2. Enables borrowers to receive substantially fully leveraged loans on properties net leased to marginal investment grade tenants and some below investment grade tenants which no other lending source is willing to provide. This would include credits ranging from BB+ to BBB+.
3. Gives borrowers a higher level of proceeds for shorter term leases. This program will enable borrowers to obtain substantially fully leveraged proceeds for other lease terms, such as 15 year lease terms, which are approximately equivalent to the proceeds under a 20 year lease. Most borrowers with properties leased to tenants for 15 year lease terms would be restricted to conduit type real estate financing limited to no more than a 75% LTV ratio, which would be well below the level of proceeds generated by the Multi-Note Loan structure of the present invention.
4. Provides better loan pricing to borrowers.

To summarize one important aspect of the present invention, in a typical senior/subordinate (A/B) loan structure, (e.g. mezzanine debt, preferred equity or hard and/or soft second mortgage notes) the additional indebtedness, in addition to adding a layer of complexity, also increases the risk profile of the loan. Rating agencies, when rating a loan (or pool of loans), typically ascribe a higher subordination level to loans using a traditional senior/subordinate loan structure to compensate for the added risk associated with the additional indebtedness. This means that a greater percentage of the loan (or pool of loans) will be rated below "AAA" as a result of the additional indebtedness.

The Multi-Note Loan structure of the present invention is unique because it generates substantially fully leveraged loan proceeds (i.e. loan proceeds similar to a traditional CTL loan at debt service coverage ratios, in a preferred embodiment, ranging from approximately 1.0 to approximately 1.05 times)

while at the same time not negatively impacting the risk profile of the overall loan or of the TA Note or the CL Note.

The intercreditor agreement between the holders of the CL Note and the TA Note clearly delineates the sources and priority of tangible asset recovery and Defaulted Lease Claims between the note holders in the event of a loan default, and maintains the credit quality of the cash flows from the underlying credit tenant's lease. The rating agencies therefore can treat the Multi-Note Loan structure of the present invention more favorably than the traditional senior/subordinate loan structures and allow the two notes to be viewed, analyzed and sold as independent instruments not dependent on one another.

Consequently, the Ratings Agencies will ascribe, at worst, a normal subordination level consistent with those loans that are similar to the TA Note and, at best, ascribe a "shadow" or "rating estimate" equal to (or slightly lower than) the credit rating of the underlying lessee to the TA Note. In addition, the rating agencies will also ascribe a "shadow" or "rating estimate" equal to the credit rating of the underlying lessee to the CL Note.

It should be noted that although the flow charts provided herein show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps that may be required. Note that the example loan term, loan amounts and other parameters discussed herein are provided only for ease of explanation, and the scope of the invention is not so limited.

It should also be noted that the word "component" and the word "step" as used herein and in the claims are intended to encompass implementations using one or more lines of software code, and/or hardware implementations, and/or equipment for receiving manual inputs. Additionally, the phrase "computer-implemented method" means that one or more of the method steps are implemented on a computer or other automatic processing device. Additionally, the words "one or more files" means that the data could be provided in one file, two or more separate files, or subparts of a single file or multiple files. Additionally, the word "associating" means adding the item or value or a reference thereto into a file or between the files or other elements and encompasses electronic association. The words "electronically associating" mean adding the item or value or an electronic reference between electronic files or other elements. The words "electronic reference" mean a URL reference, or a pointer, socket number or other backroom retail, to another internal or external location. The words "electronic files" is intended to be interpreted as a generic phrase covering all forms of data storage, including electronic, magnetic, optical, and any other convenient forms of storage.

The foregoing description of preferred embodiments of the invention has been presented for purposes of illustration and description. It is not intended to be exhaustive nor to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. It is intended that the scope of the invention be defined by the claims appended hereto, and their equivalent.

What is claimed is:

1. A method of creating a loan from a revenue stream from a lessee, comprising the steps of:
   determining or receiving a number representing a revenue stream from a lease of a leased tangible asset;
   obtaining a Breakeven Tangible Asset Note Rate, and a Tangible Asset Note Amount for a Tangible Asset Note based on a Multi-Note Loan Coupon, a Tangible Asset Note Debt Service and underwriting parameters for the tangible asset;
   calculating a Credit Lease Backed Note Debt Service after at least the Tangible Asset Note debt service is subtracted from the revenue stream;
   calculating in an electronic computing device a Breakeven Credit Lease Backed Note Rate and a Credit Lease Backed Note Amount for a Credit Lease Backed Note based on the Credit Lease Backed Note Debt Service, the Multi-Note Loan Coupon, a Credit Lease Backed Note Debt Service, and underwriting parameters;
   creating and/or receiving a file structure of one or more files for the Tangible Asset Note and/or the Credit Lease Backed Note; and
   associating the Tangible Asset Note and Credit Lease Backed Note to assign priorities for purposes of determining and distributing recoveries to holders of the Tangible Asset Note and/or the Credit Lease Backed Note and/or their designees in the event of a Multi-Note Loan default.

2. The method as defined in claim 1, wherein the Multi-Note Loan Coupon is initially an estimated value, wherein the Breakeven Tangible Asset Note Rate and the Credit Lease Backed Note Debt Service and the Breakeven Credit Lease Backed Note Rate are calculated or determined using the estimated Multi-Note Loan Coupon, and
   further comprising calculating the Multi-Note Loan Coupon based on the Breakeven Tangible Asset Note Rate and the Breakeven Credit Lease Backed Note Rate.

3. The method as defined in claim 2, further comprising the step of recalculating the Breakeven Tangible Asset Note Rate, the Breakeven Credit Lease Backed Note Rate and the Multi-Note Loan Coupon based on the original calculated Multi-Note Loan Coupon.

4. The method as defined in claim 3, further comprising the step of performing the recalculating step for the Breakeven Tangible Asset Note Rate, the Breakeven Credit Lease Backed Note Rate and the Multi-Note Loan Coupon multiple times until a criteria is met.

5. The method as defined in claim 4, wherein the criteria is that a margin from the Multi-Note Loan Coupon equals or exceeds a predetermined amount.

6. The method as defined in claim 1, wherein the Credit Lease Backed Note Rate is determined in part from a corporate credit rate spread applicable to the lessee or its industry.

7. The method as defined in claim 1, further comprising the step of calculating a Breakeven Multi-Note Loan Rate using the Breakeven Tangible Asset Note Rate and the Breakeven Credit Lease Backed Note Rate as elements in an algorithm.

8. The method as defined in claim 1, wherein the associating step comprises assigning priority of distribution of tangible asset recovery proceeds first to the Tangible Asset Note, and assigning priority of the distribution of at least some of the proceeds of a Defaulted Lease Claim first to the Credit Lease Backed Note.

9. The method as defined in claim 8, wherein the determining and distributing step comprises on the occurrence of a sale of the tangible asset after a default under the Multi-Note Loan, calculating an excess of sale proceeds over amounts due for a payoff of the Tangible Asset Note and, on receipt of the proceeds from the Defaulted Lease Claim, calculating an excess of proceeds from the Defaulted Lease Claim over amounts due for a payoff of the Credit Lease Backed Note; and electronically associating the excess of sale proceeds over the amounts due under the Tangible Asset Note with the file for the Credit Lease Backed Note and/or electronically associating the excess of proceeds from the Defaulted Lease Claim over amounts due under the Credit Lease Backed Note with the file for the Tangible Asset Note.

10. The method as defined in claim 9, further comprising the step of transferring the calculated excess amount from the sale proceeds of the tangible assets to a holder of the Credit Lease Backed Note or its designee.

11. The method as defined in claim 9, further comprising the step of transferring the calculated excess amount from the Defaulted Lease Claim to a holder of the Tangible Asset Note or its designee.

12. The method as defined in claim 1, further comprising the step of electronically associating the one or more files for the Tangible Asset Note and the Credit Lease Backed Note, which comprise electronic files.

13. The method as defined in claim 1, further comprising the step of transferring the Tangible Asset Note and Credit Lease Backed Note to different parties.

14. The method as defined in claim 1, further comprising the step of subtracting from the lease revenues loan reserve amounts to support lessor maintenance and other obligations to mitigate risk of potential termination of or interruption in the lease payments due to the failure of the lessor or others to perform their obligations.

15. The method as defined in claim 14, further comprising the step of subtracting from the Multi-Note Loan proceeds amounts to pay premiums for specialized insurance policies to mitigate the risk of potential termination of or interruption in the lease payments due to various potential contingencies.

16. The method as defined in claim 1, wherein the step of obtaining a Breakeven Tangible Asset Note Rate comprises obtaining a benchmark rate and a Breakeven Tangible Asset Note Spread.

17. The method as defined in claim 1, wherein the step of obtaining the Breakeven Credit Lease Backed Note Rate comprises determining a discount rate based on an algorithm that uses a benchmark rate and a lessee corporate bond spread as elements.

18. The method as defined in claim 1, wherein the step of obtaining the Breakeven Credit Lease Backed Note Rate comprises determining a discount rate based on an algorithm that uses a benchmark rate and a generic corporate bond spread based on a debt rating.

19. The method as defined in claim 1, further comprising the step of electronically associating the one or more files for the Tangible Asset Note and the Credit Lease Backed Note, wherein the one or more files are electronic files.

20. The method as defined in claim 1, further comprising the step of transferring the Tangible Asset Note and Credit Lease Backed Note to different parties.

21. A method of creating a loan from a revenue stream from a lessee, comprising the steps of:

determining or receiving a number representing a revenue stream from a lease of a leased tangible asset;

one of calculating or receiving at least in part via an electronic device at least one parameter of a Tangible Asset Note and the other of calculating or receiving at least one parameter of a Credit Lease Backed Note based in part on the revenue stream;

creating and/or receiving a file structure of one or more files for the Tangible Asset Note and/or the Credit Lease Backed Note; and associating the Tangible Asset Note and Credit Lease Backed Note to assign priorities for purposes of application of the revenue stream and/or for purposes of determining and distributing recoveries to holders of the Tangible Asset Note and/or the Credit Lease Backed Note and/or their designees in the event of a Multi-Note Loan default.

22. The method as defined in claim 21, wherein the associating step further comprises allocating rights and responsibilities of the holders of such notes and associating those rights and responsibilities with the Tangible Asset Note and Credit Lease Backed Note file structure.

23. The method as defined in claim 21, comprising the step of calculating an Credit Lease Backed Note Debt Service after a Tangible Asset Note debt service is subtracted from the revenue stream; and wherein at least one parameter for the Credit Lease Backed Note is determined based on the Credit Lease Backed Note Debt Service.

24. The method as defined in claim 21, wherein the Multi-Note Loan Coupon is initially an estimated value, and wherein the at least one Tangible Asset Note parameter and at least one Credit Lease Backed Note parameter are calculated or determined using the estimated Multi-Note Loan Coupon; and further comprising re-calculating the Multi-Note Loan Coupon based on the resulting at least one Tangible Asset Note parameter and the at least one Credit Lease Backed Note parameter.

25. The method as defined in claim 24, further comprising the step of recalculating at least one parameter for the Tangible Asset Note and the Credit Lease Backed Note and recalculating the Multi-Note Loan Coupon based on the calculated Multi-Note Loan Coupon.

26. The method as defined in claim 25, further comprising the step of performing the recalculating step for the at least one parameter for the Tangible Asset Note and the Credit Lease Backed Note and the Multi-Note Loan Coupon multiple times until a criteria is met.

27. The method as defined in claim 26, wherein the criteria is that a margin from the Multi-Note Loan Coupon equals or exceeds a predetermined amount.

28. The method as defined in claim 25, further comprising the steps of providing a web page with web content that performs the calculating or determining step, and the recalculating of at least one parameter for the Tangible Asset Note and the Credit Lease Backed Note and recalculating the Multi-Note Loan Coupon step.

29. The method as defined in claim 21, wherein one of the parameters for the Credit Lease Backed Note is a Credit Lease Backed Note Rate which is determined in part from a corporate credit rate spread applicable to the lessee or its industry.

30. The method as defined in claim 21, wherein the associating step comprises assigning priority of distribution of tangible asset recovery proceeds first to the Tangible Asset Note, and assigning priority of the distribution of at least some of the proceeds of a Defaulted Lease Claim first to the Credit Lease Backed Note.

31. The method as defined in claim 30, wherein the determining and distributing step comprises on the occurrence of a sale of the tangible asset after a default under the Multi-Note Loan, calculating an excess of sale proceeds over amounts due for a payoff of the Tangible Asset Note and, on receipt of the proceeds from the Defaulted Lease Claim, calculating an excess of proceeds from the Defaulted Lease Claim over amounts due for a payoff of the Credit Lease Backed Note; and electronically associating the excess of sale proceeds over the amounts due under the Tangible Asset Note with the file for the Credit Lease Backed Note and electronically associating the excess of proceeds from the defaulted lease claim over amounts due under the Credit Lease Backed Note with the file for the Tangible Asset Note.

32. The method as defined in claim 31, further comprising the step of transferring the calculated excess amount from the sale proceeds of the tangible assets to a holder of the Credit Lease Backed Note or its designee.

33. The method as defined in claim 31, further comprising the step of transferring the calculated excess amount from the Defaulted Lease Claim to a holder of the Tangible Asset Note or its designee.

34. The method as defined in claim 21, further comprising the step of subtracting from the revenues loan reserve amounts to support lessor maintenance and other obligations to mitigate risk of potential termination of or interruption in the lease payments due to the failure of the lessor or others to perform their obligations.

35. The method as defined in claim 34, further comprising the step of subtracting from Multi-Note Loan proceeds amounts to pay premiums for specialized insurance policies to mitigate the risk of potential termination of or interruption in the lease payments due to various potential.

36. The method as defined in claim 21, wherein the step of calculating and determining parameters for the Tangible Asset Note comprises obtaining a benchmark rate and a Breakeven Tangible Asset Note Spread and then determining a Breakeven Tangible Asset Note Rate.

37. The method as defined in claim 21, wherein the step of calculating and determining parameters for the Credit Lease Backed Note comprises determining a discount rate based on an algorithm that uses a benchmark rate and a lessee corporate bond spread as elements and then determining a Breakeven Credit Lease Backed Note Rate.

38. The method as defined in claim 21, wherein the step of calculating or determining at least one parameter for the Credit Lease Backed Note comprises determining a discount rate based on an algorithm that uses a benchmark rate and a generic corporate bond spread based on a debt rating and then determining a Breakeven Credit Lease Backed Note Rate.

39. The method as defined in claim 21, further comprising the step of aggregating a plurality of the Tangible Asset Notes or the Credit Lease Backed Notes to obtain a pool value.

40. The method as defined in claim 39, wherein the pool value is sent electronically to a potential buyer.

41. The method as defined in claim 21, further comprising the steps of providing a web page with web content that performs the calculating or determining step.

42. The method as defined in claim 41, further comprising the step of calculating a Multi-Note Loan Coupon using the web content; and displaying the Multi-Note Loan Coupon to a potential borrower.

43. The method as defined in claim 41, wherein a web page that is provided with web content displays Tangible Asset Notes and Credit Lease Backed Notes and that facilitates a potential buyer forming a customized pool of Tangible Asset Notes or Credit Lease Backed Notes.

44. The method as defined in claim 21, wherein the associating step comprises assigning priority of distribution of tangible asset recovery proceeds first to the Tangible Asset Note, and assigning priority of the distribution of the proceeds of a Defaulted Lease Claim first to the Credit Lease Backed Note.

45. A computer-implemented method of facilitating the creation of a loan from a revenue stream from a lessee, comprising the following steps:

determining rents from a lease of an asset;

calculating or receiving one or more Tangible Asset note parameters at least in part based on the rents determined in the rent determining step;

calculating or receiving a Credit Lease Backed Note Debt Service at least in part based on at least one of the Tangible Asset note parameters;

obtaining a Breakeven Credit Lease Backed Note Rate; and calculating a Breakeven Credit Lease Backed Note Value based on predetermined elements including the Credit Lease Backed Note Debt Service, the Breakeven Credit Lease Backed Note Rate and a term for the Credit Lease Backed Note;

wherein at least one of the steps is performed electronically.

46. The method as defined in claim 45, wherein the tangible asset is real estate.

47. The method as defined in claim 45, further comprising the step of aggregating a plurality of the Tangible Asset Notes or the Credit Lease Backed Notes to obtain a pool value.

48. The method as defined in claim 47, wherein the pool value is sent electronically to a potential buyer.

49. A computer-implemented system of creating a loan from a revenue stream from a lessee, comprising:

a processor programmed to perform the following method steps:

determining a revenue stream from a lease of a leased tangible asset;

obtaining a Breakeven Tangible Asset Note Rate, and a Tangible Asset Note Amount for a Tangible Asset Note based on a Multi-Note Loan Coupon, a Tangible Asset Note Debt Service and underwriting parameters for the tangible asset;

calculating a Credit Lease Backed Note Debt Service after at least the Tangible Asset Note debt service is subtracted from the revenue stream;

calculating a Breakeven Credit Lease Backed Note Rate and a Credit Lease Backed Note Amount for a Credit Lease Backed Note based on the Credit Lease Backed Note Debt Service, the Multi-Note Loan Coupon, a Credit Lease Backed Note Debt Service, and underwriting parameters;

creating and/or receiving a file structure of one or more files for the Tangible Asset Note and/or the Credit Lease Backed Note; and associating the Tangible Asset Note and Credit Lease Backed Note to assign priorities for purposes of determining and distributing recoveries to holders of the Tangible Asset Note and/or the Credit Lease Backed Note and/or their designees in the event of a Multi-Note Loan default.

50. The method as defined in claim 45, further comprising adding a lender profit parameter.

51. A program product for creating a loan from a revenue stream from a lessee, comprising:
- a computer usable medium having computer readable program code embodied therein that is to be executed by a computer, the computer readable program code comprising:
  - computer readable program code for receiving a number representing a revenue stream from a lease of a leased tangible asset;
  - computer readable program code for obtaining a Breakeven Tangible Asset Note Rate, and a Tangible Asset Note Amount for a TA-Tangible Asset Note based on a Multi-Note Loan Coupon, a Tangible Asset Note Debt Service and underwriting parameters for the tangible asset;
  - computer readable program code for calculating a Credit Lease Backed Note Debt Service after at least the Tangible Asset Note debt service is subtracted from the revenue stream;
  - computer readable program code for calculating a Breakeven Credit Lease Backed Note Rate and a Credit Lease Backed Note Amount for a Credit Lease Backed Note based on the Credit Lease Backed Note Debt Service, the Multi-Note Loan Coupon, a Credit Lease Backed Note Debt Service, and underwriting parameters;
  - computer readable program code for creating and/or receiving a file structure of one or more files for the Tangible Asset Note and/or the Credit Lease Backed Note; and
  - computer readable program code for associating the Tangible Asset Note and Credit Lease Backed Note to assign priorities for purposes of determining and distributing recoveries to holders of the Tangible Asset Note and/or the Credit Lease Backed Note and/or their designees in the event of a Multi-Note Loan default.

52. The program product as defined in claim 51, wherein the Multi-Note Loan Coupon is initially an estimated value, wherein the Breakeven Tangible Asset Note Rate and the Credit Lease Backed Note Debt Service and the Breakeven Credit Lease Backed Note Rate are calculated or determined using the estimated Multi-Note Loan Coupon, and
- further comprising code for calculating the Multi-Note Loan Coupon based on the Breakeven Tangible Asset Note Rate and the Breakeven Credit Lease Backed Note Rate.

53. The program product as defined in claim 52, further comprising code for a step of recalculating the Breakeven Tangible Asset Note Rate, the Breakeven Credit Lease Backed Note Rate and the Multi-Note Loan Coupon based on the original calculated Multi-Note Loan Coupon.

54. The program product defined in claim 53, further comprising code for a step of performing the recalculating step for the Breakeven Tangible Asset Note Rate, the Breakeven Credit Lease Backed Note Rate and the Multi-Note Loan Coupon multiple times until a criteria is met.

55. The program product as defined in claim 54, wherein the criteria is that a margin from the Multi-Note Loan Coupon equals or exceeds a predetermined amount.

56. The program product as defined in claim 51, wherein the Credit Lease Backed Note Rate is determined in part from a corporate credit rate spread applicable to the lessee or its industry.

57. The program product as defined in claim 51, further comprising code for a step of calculating a Breakeven Multi-Note Loan Rate using the Breakeven Tangible Asset Note Rate and the Breakeven Credit Lease Backed Note Rate as elements in an algorithm.

58. The program product as defined in claim 51, wherein the associating step comprises assigning priority of distribution of tangible asset recovery proceeds first to the Tangible Asset Note, and assigning priority of the distribution of at least some of the proceeds of a Defaulted Lease Claim first to the Credit Lease Backed Note.

59. The program product as defined in claim 58, wherein the determining and distributing step comprises on the occurrence of a sale of the tangible asset after a default under the Multi-Note Loan, calculating an excess of sale proceeds over amounts due for a payoff of the Tangible Asset Note and, on receipt of the proceeds from the Defaulted Lease Claim, calculating an excess of proceeds from the Defaulted Lease Claim over amounts due for a payoff of the Credit Lease Backed Note; and
- electronically associating the excess of sale proceeds over the amounts due under the Tangible Asset Note with the file for the Credit Lease Backed Note and/or electronically associating the excess of proceeds from the Defaulted Lease Claim over amounts due under the Credit Lease Backed Note with the file for the Tangible Asset Note.

60. The program product as defined in claim 59, further comprising code for a step of transferring the calculated excess amount from the sale proceeds of the tangible assets to a holder of the Credit Lease Backed Note or its designee.

61. The program product as defined in claim 59, further comprising the step of transferring the calculated excess amount from the Defaulted Lease Claim to a holder of the Tangible Asset Note or its designee.

62. The program product as defined in claim 51, further comprising code for a step of electronically associating the one or more files for the Note and the Credit Lease Backed Note.

63. The program product as defined in claim 51, further comprising code for a step of transferring the Tangible Asset Note and Credit Lease Backed Note to different parties.

64. The program product as defined in claim 51, further comprising code for a step of subtracting from the lease revenues loan reserve amounts to support lessor maintenance and other obligations to mitigate risk of potential termination of or interruption in the lease payments due to the failure of the lessor or others to perform their obligations.

65. The program product as defined in claim 64, further comprising code for a step of subtracting from the Multi-Note Loan proceeds amounts to pay premiums for specialized insurance policies to mitigate the risk of potential termination of or interruption in the lease payments due to various potential contingencies.

66. The program product as defined in claim 51, wherein the step of obtaining a Breakeven Tangible Asset Note Rate comprises obtaining a benchmark rate and a Breakeven Tangible Asset Note Spread.

67. The program product as defined in claim 51, wherein the step of obtaining the Breakeven Credit Lease Backed Note Rate comprises determining a discount rate based on an algorithm that uses a benchmark rate and a lessee corporate bond spread as elements.

68. The program product as defined in claim 51, wherein the step of obtaining the Breakeven Credit Lease Backed Note Rate comprises determining a discount rate based on an algorithm that uses a benchmark rate and a generic corporate bond spread based on a debt rating.

69. A program product for creating a loan from a revenue stream from a lessee, comprising:
a computer usable medium having computer readable program code embodied therein, the computer readable program code comprising:
computer readable program code for receiving a number representing a revenue stream from a lease of a leased tangible asset;
computer readable program code for one of calculating or receiving at least in part at least one parameter of a Tangible Asset Note and the other of calculating or receiving at least one parameter of a Credit Lease Backed Note based in part on the revenue stream;
computer readable program code for creating and/or receiving a file structure of one or more files for the Tangible Asset Note and/or the Credit Lease Backed Note; and
computer readable program code for associating the Tangible Asset Note and Credit Lease Backed Note to assign priorities for purposes of application of the revenue stream and/or for purposes of determining and distributing recoveries to holders of the Tangible Asset Note and/or the Credit Lease Backed Note and/or their designees in the event of a Multi-Note Loan default.

70. The program product as defined in claim 69, wherein the associating step further comprises allocating rights and responsibilities of the holders of such notes and associating those rights and responsibilities with the Tangible Asset Note and Credit Lease Backed Note file structure.

71. The program product as defined in claim 69, comprising code for a step of calculating an Credit Lease Backed Note Debt Service after a Tangible Asset Note debt service is subtracted from the revenue stream; and
wherein at least one parameter for the Credit Lease Backed Note is determined based on the Credit Lease Backed Note Debt Service.

72. The program product as defined in claim 69, wherein the calculating and determining parameters of a Tangible Asset Note and a Credit Lease Backed Note step is also based in part on a Multi-Note Loan Coupon.

73. The program product as defined in claim 72, wherein the Multi-Note Loan Coupon is initially an estimated value, and wherein the at least one Tangible Asset Note parameter and at least one Credit Lease Backed Note parameter are calculated or determined using the estimated Multi-Note Loan Coupon; and
further comprising code for re-calculating the Multi-Note Loan Coupon based on the resulting at least one Tangible Asset Note parameter and the at least one Credit Lease Backed Note parameter.

74. The program product as defined in claim 73, further comprising code for a step of recalculating at least one parameter for the Tangible Asset Note and the Credit Lease Backed Note and recalculating the Multi-Note Loan Coupon based on the calculated Multi-Note Loan Coupon.

75. The program product as defined in claim 74, further comprising the step of performing the recalculating step for the at least one parameter for the Tangible Asset Note and the Credit Lease Backed Note and the Multi-Note Loan Coupon multiple times until a criteria is met.

76. The program product as defined in claim 75, wherein the criteria is that a margin from the Multi-Note Loan Coupon equals or exceeds a predetermined amount.

77. The program product as defined in claim 73, further comprising code for steps of providing a web page with web content that performs the calculating or determining step, and the recalculating of at least one parameter for the Tangible Asset Note and the Credit Lease Backed Note and recalculating the Multi-Note Loan Coupon step.

78. The program product as defined in claim 69, wherein one of the parameters for the Credit Lease Backed Note is a Credit Lease Backed Note Rate which is determined in part from a corporate credit rate spread applicable to the lessee or its industry.

79. The program product as defined in claim 69, wherein the associating step comprises assigning priority of distribution of tangible asset recovery proceeds first to the Tangible Asset Note, and assigning priority of the distribution of at least some of the proceeds of a Defaulted Lease Claim first to the Credit Lease Backed Note.

80. The program product as defined in claim 79, wherein the determining and distributing step comprises on the occurrence of a sale of the tangible asset after a default under the Multi-Note Loan, calculating an excess of sale proceeds over amounts due for a payoff of the Tangible Asset Note and, on receipt of the proceeds from the Defaulted Lease Claim, calculating an excess of proceeds from the Defaulted Lease Claim over amounts due for a payoff of the Credit Lease Backed Note; and
electronically associating the excess of sale proceeds over the amounts due under the Tangible Asset Note with the file for the Credit Lease Backed Note and electronically associating the excess of proceeds from the defaulted lease claim over amounts due under the Credit Lease Backed Note with the file for the Tangible Asset Note.

81. The program product as defined in claim 80, further comprising code for a step of transferring the calculated excess amount from the sale proceeds of the tangible assets to a holder of the Credit Lease Backed Note or its designee.

82. The program product as defined in claim 80, further comprising code for a step of transferring the calculated excess amount from the Defaulted Lease Claim to a holder of the Tangible Asset Note or its designee.

83. The program product as defined in claim 69, further comprising code for a step of electronically associating the one or more files for the Tangible Asset Note and the Credit Lease Backed Note.

84. The program product as defined in claim 69, further comprising code for a step of transferring the Tangible Asset Note and Credit Lease Backed Note to different parties.

85. The program product as defined in claim 69, further comprising code for a step of subtracting from the revenues loan reserve amounts to support lessor maintenance and other obligations to mitigate risk of potential termination of or interruption in the lease payments due to the failure of the lessor or others to perform their obligations.

86. The program product as defined in claim 85, further comprising code for a step of subtracting from Multi-Note Loan proceeds amounts to pay premiums for specialized insurance policies to mitigate the risk of potential termination of or interruption in the lease payments due to various potential.

87. The program product as defined in claim 69, wherein the step of calculating or determining at least one parameter for the Tangible Asset Note comprises obtaining a benchmark rate and a Breakeven Tangible Asset Note Spread and then determining a Breakeven Tangible Asset Note Rate.

88. The program product as defined in claim 69, wherein the step of calculating or determining at least one parameter for the Credit Lease Backed Note comprises determining a discount rate based on an algorithm that uses a benchmark rate and a lessee corporate bond spread as elements and then determining a Breakeven Credit Lease Backed Note Rate.

89. The program product as defined in claim 69, wherein the step of calculating or determining at least one parameter for the Credit Lease Backed Note comprises determining a discount rate based on an algorithm that uses a benchmark rate and a generic corporate bond spread based on a debt rating and then determining a Breakeven Credit Lease Backed Note Rate.

90. The program product as defined in claim 69, further comprising code for a step of aggregating a plurality of the Tangible Asset Notes or the Credit Lease Backed Notes to obtain a pool value.

91. The program product as defined in claim 90, further comprising code for sending the pool value electronically to a potential buyer.

92. The program product as defined in claim 69, further comprising code for steps of providing a web page with web content that performs the calculating or determining step.

93. The program product as defined in claim 92, further comprising code for a step of calculating a Multi-Note Loan Coupon using the web content; and
displaying the Multi-Note Loan Coupon to a potential borrower.

94. The program product as defined in claim 92, further comprising web content code for displaying on a web page Tangible Asset Notes and Credit Lease Backed Notes and that facilitates a potential buyer forming a customized pool of Tangible Asset Notes or Credit Lease Backed Notes.

95. The program product as defined in claim 69, wherein the associating step comprises assigning priority of distribution of tangible asset recovery proceeds first to the Tangible Asset Note and/or assigning priority of the distribution of at least some of the proceeds of a Defaulted Lease Claim first to the Credit Lease Backed Note.

96. A program product for facilitating the creation of a loan from a revenue stream from a lessee, comprising:
a computer usable medium having computer readable program code embodied therein that is to be executed by a computer, the computer readable program code comprising:
computer readable program code for determining rents from a lease of an asset;
computer readable program code for calculating or receiving one or more Tangible Asset note parameters at least in part based on the rents determined in the rent determining step;
computer readable program code for calculating or obtaining a Credit Lease Backed Note Debt Service at least in part based on at least one of the Tangible Asset note parameters;
computer readable program code for obtaining a Breakeven Credit Lease Backed Note Rate;
computer readable program code for calculating a Breakeven Credit Lease Backed Note Value based on predetermined elements including the Credit Lease Backed Note Debt Service, the Breakeven Credit Lease Backed Note Rate and a term for the Credit Lease Backed Note.

97. The program product as defined in claim 96, further comprising program code for adding a lender profit parameter.

* * * * *